(12) United States Patent
Shiraishi et al.

(10) Patent No.: US 11,662,356 B2
(45) Date of Patent: May 30, 2023

(54) BIOCHEMICAL ANALYSIS APPARATUS AND METHOD OF OPERATING THE SAME

(71) Applicant: FUJIFILM Corporation, Tokyo (JP)

(72) Inventors: Jumpei Shiraishi, Kanagawa (JP); Shigetoshi Ishikawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 424 days.

(21) Appl. No.: 16/541,146

(22) Filed: Aug. 14, 2019

(65) Prior Publication Data

US 2019/0369129 A1 Dec. 5, 2019

Related U.S. Application Data

(63) Continuation of application No. PCT/JP2018/003348, filed on Feb. 1, 2018.

(30) Foreign Application Priority Data

Feb. 15, 2017 (JP) .............................. JP2017-025851

(51) Int. Cl.
*G01N 35/02* (2006.01)
*G01N 35/00* (2006.01)
(Continued)

(52) U.S. Cl.
CPC ....... *G01N 35/02* (2013.01); *G01N 35/00871* (2013.01); *G01N 35/1009* (2013.01);
(Continued)

(58) Field of Classification Search
CPC ............. G01N 35/02; G01N 35/00871; G01N 35/1009; G01N 2035/00891;
(Continued)

(56) References Cited

U.S. PATENT DOCUMENTS 8,535,607 B2 * 9/2013 Wakamiya ....... G01N 35/00732
422/64
9,157,924 B2 * 10/2015 Yamato .............. G01N 35/1002
(Continued)

FOREIGN PATENT DOCUMENTS

CN 101097222 1/2008
CN 101275963 10/2008
(Continued)

OTHER PUBLICATIONS

"Search Report of Europe Counterpart Application", dated May 25, 2020, p. 1-p. 10.
(Continued)

*Primary Examiner* — Jill A Warden
*Assistant Examiner* — John McGuirk
(74) *Attorney, Agent, or Firm* — JCIPRNET

(57) ABSTRACT

A sample installation part in which a sample container accommodating a sample to be subjected to biochemical analysis is installed, and consumables installation parts in which consumables to be used for the biochemical analysis are installed are accommodated in an apparatus body of a biochemical analysis apparatus. The apparatus body is provided with an opening part that leads to a sample tray. An instruction receiving unit receives a movement instruction for moving the sample tray from a normal position where the sample installation part is disposed on the opening part side to a consumables replenishment position where the consumables installation parts are disposed on the opening part side. A driving control unit moves the sample tray from the normal position to the consumables replenishment position in a case where the movement instruction is received by the instruction receiving unit.

9 Claims, 21 Drawing Sheets

(51) Int. Cl.
*G01N 35/10* (2006.01)
*G01N 35/04* (2006.01)

(52) U.S. Cl.
CPC .............. *G01N 2035/00891* (2013.01); *G01N 2035/0441* (2013.01); *G01N 2035/0494* (2013.01); *G01N 2035/1025* (2013.01)

(58) Field of Classification Search
CPC ... G01N 2035/0441; G01N 2035/0494; G01N 2035/1025; G01N 2035/0446; G01N 2035/0091; G01N 35/025; G01N 35/00712
See application file for complete search history.

(56) References Cited

U.S. PATENT DOCUMENTS

| | | | | |
|---|---|---|---|---|
| 2008/0014118 | A1* | 1/2008 | Kitagawa | G01N 35/00663 422/64 |
| 2009/0224032 | A1 | 9/2009 | Kondou et al. | |
| 2014/0119994 | A1* | 5/2014 | Ariyoshi | G01N 35/00722 422/68.1 |
| 2017/0176480 | A1* | 6/2017 | Moschell | G01N 35/00722 |

FOREIGN PATENT DOCUMENTS

| | | |
|---|---|---|
| EP | 1498734 | 1/2005 |
| EP | 2835649 | 2/2015 |
| EP | 1873530 | 1/2018 |
| JP | H11231729 | 8/1999 |
| JP | H11231729 A * | 8/1999 |
| JP | 2004286469 | 10/2004 |
| JP | 2004286469 A * | 10/2004 |
| JP | 2009210536 | 9/2009 |
| JP | 2009250743 | 10/2009 |
| JP | 2013076683 | 4/2013 |
| WO | 2018005239 | 1/2018 |

OTHER PUBLICATIONS

"International Search Report (Form PCT/ISA/210) of PCT/JP2018/003348," dated Mar. 20, 2018, with English translation thereof, pp. 1-4.

"Written Opinion of the International Searching Authority (Form PCT/ISA/237) of PCT/JP2018/003348," dated Mar. 20, 2018, with English translation thereof, pp. 1-14.

"Search Report of Europe Counterpart Application", dated Feb. 17, 2020, pp. 1-10.

"Office Action of China Counterpart Application" with English translation thereof, dated Sep. 30, 2022, p. 1-p. 20.

* cited by examiner

FIG. 4

| DRY ANALYSIS ELEMENT | ITEM CODE | MEASUREMENT ITEM |
|---|---|---|
| D1 | 0001 | MI1 |
| D2 | 0002 | MI2 |
| D3 | 0003 | MI3 |
| D4 | 0004 | MI4 |
| D5 | 0005 | MI5 |
| ⋮ | ⋮ | ⋮ |

30

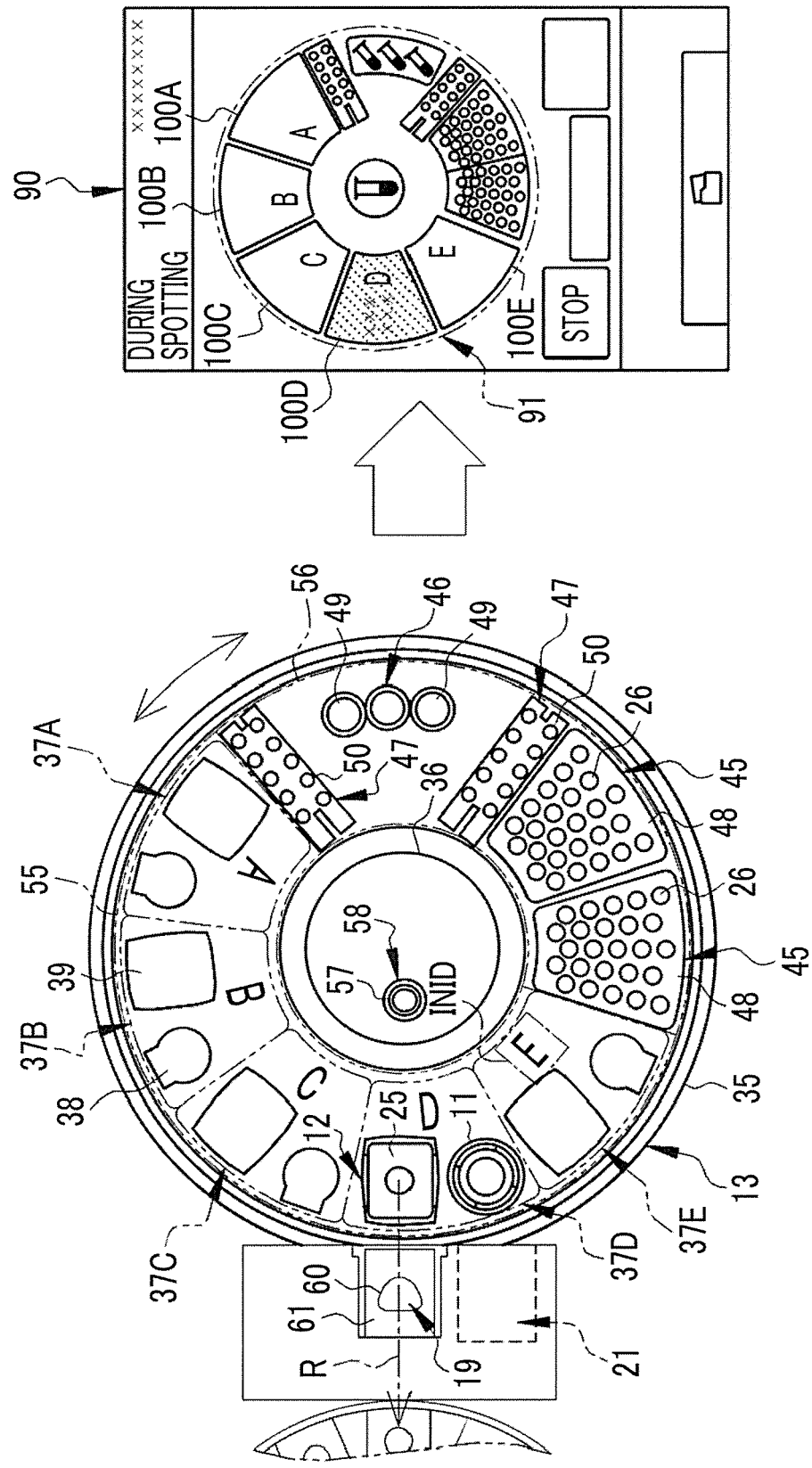

BIOCHEMICAL ANALYSIS APPARATUS AND METHOD OF OPERATING THE SAME

CROSS-REFERENCE TO RELATED APPLICATIONS

This application is a Continuation of PCT International Application No. PCT/JP2018/003348 filed on 1 Feb. 2018, which claims priority under 35 U.S.C § 119(a) to Japanese Patent Application No. 2017-025851 filed on 15 Feb. 2017. The above application is hereby expressly incorporated by reference, in its entirety, into the present application.

BACKGROUND OF THE INVENTION

1. Field of the Invention

The present invention relates to a biochemical analysis apparatus and a method of operating the same.

2. Description of the Related Art

Biochemical analysis apparatuses that analyze samples, such as blood and urine, have been known (for example, refer to JP2013-076683A). The samples are accommodated in sample containers, and the sample containers are installed in sample installation parts provided in a sample tray within a biochemical analysis apparatus. The sample tray is also provided with consumables installation parts in which various consumables are installed, in addition to the sample installation parts. As the consumables, there are nozzle tips that suction and discharge samples, diluting solutions that dilute the samples, mixing cups that mix the samples with the diluting solutions, and the like.

In a biochemical analysis apparatus described in JP2013-076683A, a circular sample tray is used. A substantially half region of the sample tray is occupied by a plurality of sample installation parts, and the remaining half region is occupied by a plurality of consumables installation parts. These installation parts are disposed in an arcuate shape. A spotting unit that spots a sample to dry analysis elements for measuring the amounts of contained components in the sample is disposed on an extension line drawn from the center of the sample tray. In order to cause the plurality of sample installation parts to face the spotting unit, the sample tray is rotationally driven around an axis thereof.

SUMMARY OF THE INVENTION

Although not illustrated in JP2013-076683A, in the biochemical analysis apparatus, the sample tray is accommodated in an apparatus body, and an opening part leading to the sample tray is provided in the apparatus body in order to allow a user to make an access to the sample tray. Typically, the sample installation parts that frequently enter and leave the sample containers are disposed on the opening part side (front side) so that the user makes an easy access thereto, and the consumables installation parts are disposed on a side (back side) opposite to the opening part.

In this way, in the case of a layout relationship in which the sample installation parts are disposed on the opening part side and the consumables installation parts are disposed on the side opposite to the opening part side, it is necessary for the user to extend his/her hand across above the sample installation parts in a case where the user makes an access to the consumables installation parts via the opening part in order to replenish the consumables. Hence, there is a concern that the sample may adhere to the user's hand or arm in a case where the consumables are replenished.

An object of the invention is to provide a biochemical analysis apparatus capable of maintaining a sanitary condition of a user and a method of operating the same.

In order to solve the above problems, a biochemical analysis apparatus of the invention comprises a sample tray provided with a sample installation part in which a sample container accommodating a sample to be subjected to biochemical analysis is installed, and a consumables installation part in which consumables to be used for the biochemical analysis are installed; an apparatus body that accommodates the sample tray; an opening part that is provided in the apparatus body and leads to the sample tray; an instruction receiving unit that receives a movement instruction for moving the sample tray from a normal position where the sample installation part is disposed on the opening part side to a consumables replenishment position where the consumables installation part is disposed on the opening part side; and a driving control unit that controls driving of the sample tray and moves the sample tray from the normal position to the consumables replenishment position in a case where the movement instruction is received by the instruction receiving unit.

It is preferable that the biochemical analysis apparatus further comprises a first driving button that outputs the movement instruction to the instruction receiving unit in accordance with an operation.

It is preferable that the biochemical analysis apparatus further comprises a first display control unit that schematically displays an array state of the sample installation part and the consumables installation part in the sample tray, and performs a control such that a layout diagram provided with a first display section corresponding to the sample installation part and a second display section corresponding to the consumables installation part is displayed on a display unit, and the second display section functions as the first driving button. In this case, it is preferable that the first display control unit displays a residual amount of the consumables on the second display section.

Additionally, it is preferable that the sample tray is circular, and is rotationally driven around an axis thereof under the control of the driving control unit, and the first display control unit changes a display posture of the layout diagram in accordance with a rotational position of the sample tray.

It is preferable that the biochemical analysis apparatus further comprises an error detecting unit that detects an error regarding the consumables and outputs the movement instruction to instruction receiving unit in a case where the error is detected. It is preferable that the biochemical analysis apparatus further comprises a second display control unit that performs a control such that guides showing a method for handling the error are displayed on a display unit in a case where the error is detected by the error detecting unit. It is preferable that the error detecting unit detects that the residual amount of the consumables reaches zero, as the error.

It is preferable that the biochemical analysis apparatus further comprises a second driving button that outputs a return instruction for returning the sample tray from the consumables replenishment position to the normal position to the instruction receiving unit in accordance with an operation, and the driving control unit moves the sample tray from the consumables replenishment position to the normal position in a case where the second driving button is return instruction is received by the instruction receiving unit.

It is preferable that the sample tray is circular, and is rotationally driven around an axis thereof under the control of the driving control unit, and the sample installation part and the consumables installation part are disposed in an arcuate shape.

It is preferable that a plurality of the sample installation parts and a plurality of the consumables installation parts are provided, the sample installation parts are collectively disposed in a first region of sample tray, and the plurality of consumables installation parts are collectively disposed in a second region that is a remaining region excluding the first region. In this case, it is preferable that the consumables replenishment position is a position where a center of the second region coincides with a center of the opening part.

In order to solve the above problems, a method of operating a biochemical analysis apparatus of the invention comprises a sample tray that is provided with a sample installation part in which a sample container accommodating a sample to be subjected to biochemical analysis is installed, and a consumables installation part in which consumables to be used for the biochemical analysis are installed, an apparatus body that accommodates the sample tray, and an opening part that is provided in the apparatus body and leads to the sample tray. The method comprises an instruction receiving step of receiving a movement instruction for moving the sample tray from a normal position where the sample installation part is disposed on the opening part side to a consumables replenishment position where the consumables installation part is disposed on the opening part side; and a driving control step of controlling driving of the sample tray and moving the sample tray from the normal position to the consumables replenishment position in a case where the movement instruction is received in the instruction receiving step.

According to the invention, the sample tray is moved from the normal position where the sample installation part is disposed on the opening part side to the consumables replenishment position where the consumables installation part is disposed on the opening part side. Thus, it is necessary for a user to extend his/her hand across above the sample installation parts in a case where the user makes an access to the consumables installation part. For this reason, there is no concern that the sample adheres to the user's hand or arm. Hence, it is possible to provide the biochemical analysis apparatus capable of maintaining a sanitary condition of the user and the method of operating the same.

BRIEF DESCRIPTION OF THE DRAWINGS

FIG. 4 is a table illustrating measurement items corresponding to respective dry analysis elements.

FIG. 21 is a view illustrating a third embodiment in which a display posture of the layout diagram is changed in accordance with the rotational position of the sample tray.

DESCRIPTION OF THE PREFERRED EMBODIMENTS

First Embodiment

Figure 1:
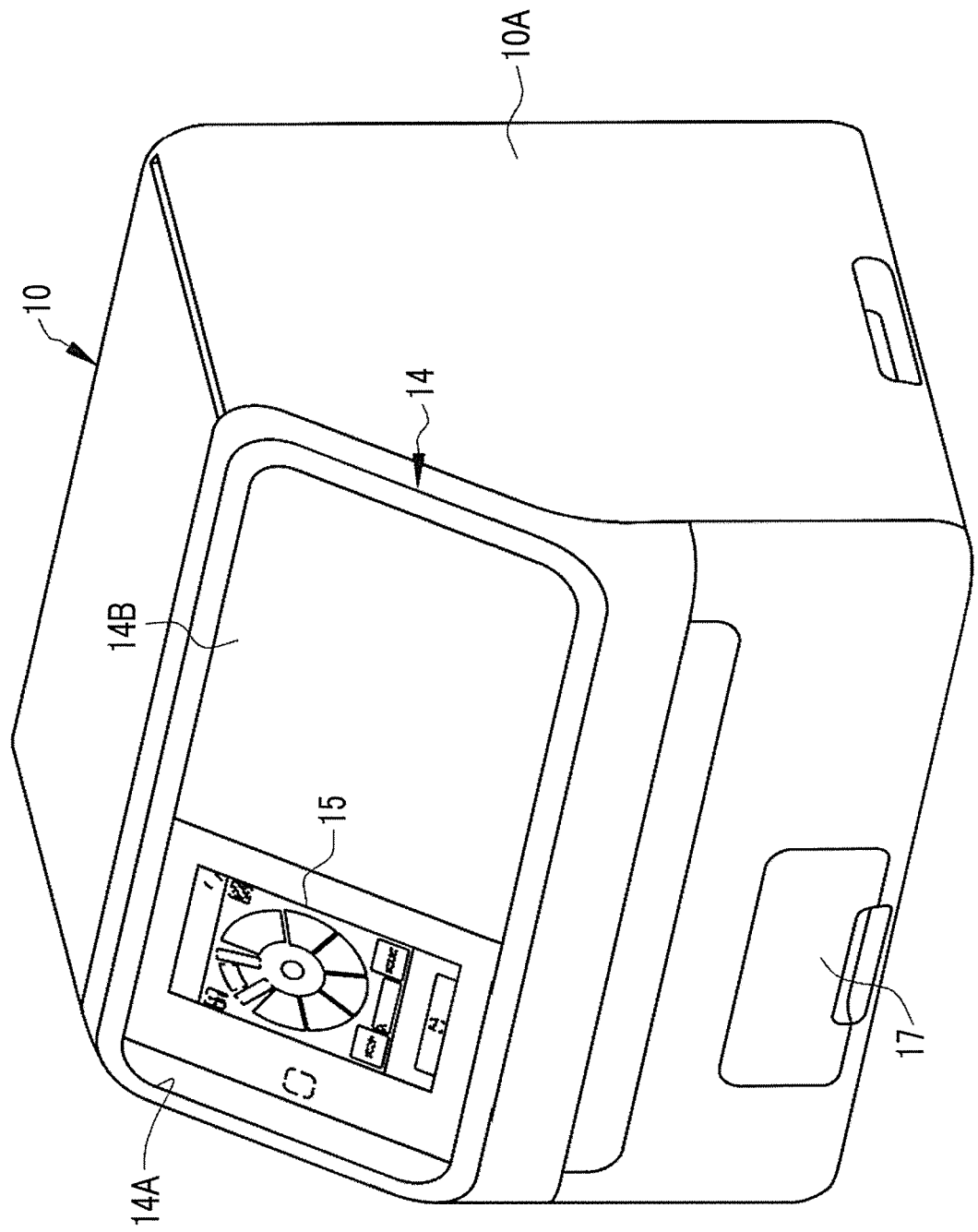
FIG. 1 is a perspective view illustrating an external appearance of a biochemical analysis apparatus.
Figure 2:
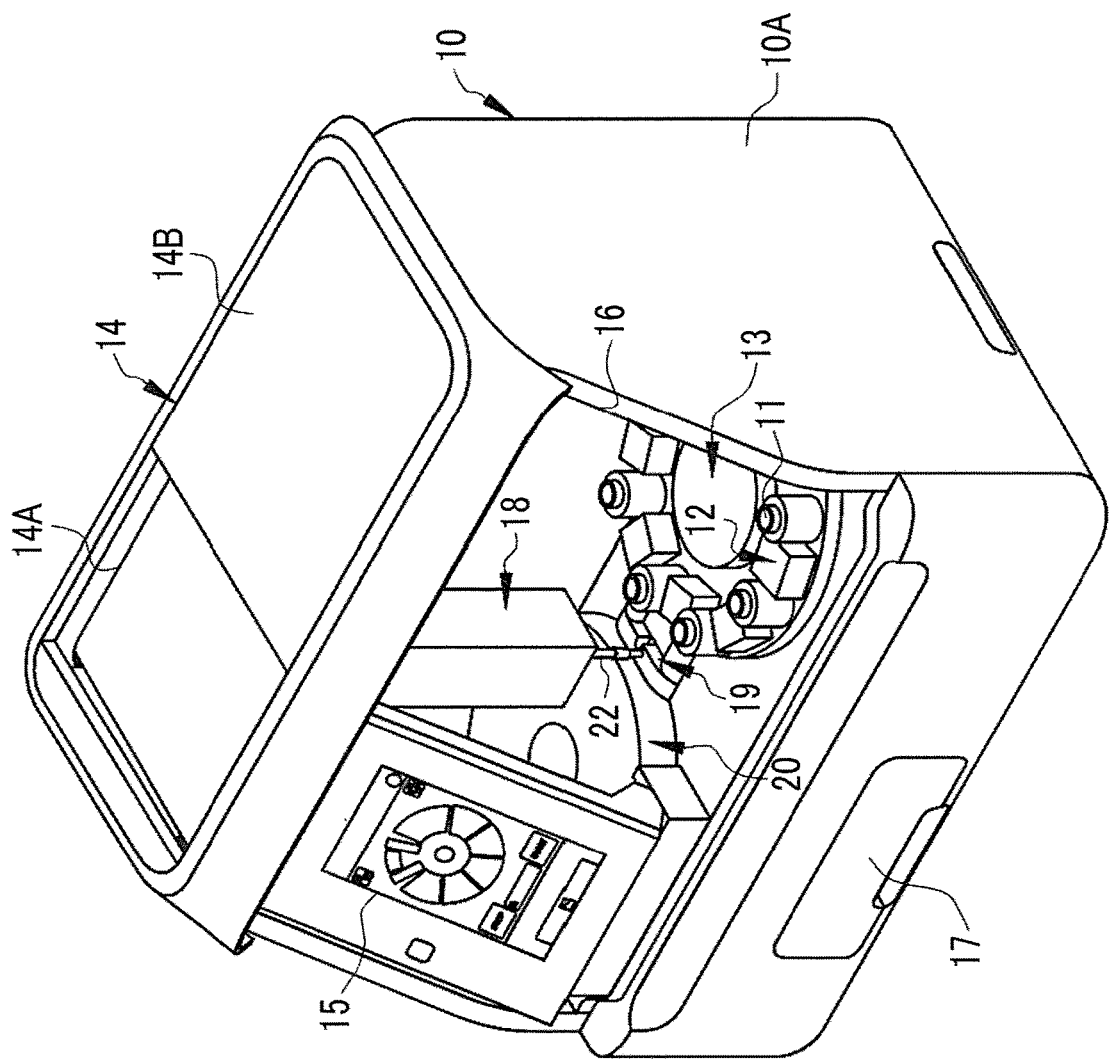
FIG. 2 is a perspective view illustrating the biochemical analysis apparatus in a state where a lid is open.

In FIG. 1 and FIG. 2, the biochemical analysis apparatus 10 is installed in, for example, an examination department of a hospital, and analyzes samples, such as blood and urine, in accordance with orders from a diagnosis department. A sample is accommodated in a sample container 11, and is installed in a sample tray 13 within the biochemical analysis apparatus 10 in a set with a cartridge 12 that accommodates unused dry analysis elements 25 (refer to FIG. 3).

The biochemical analysis apparatus 10 has a box-shaped apparatus body 10A. A front upper part of the apparatus body 10A serves as an inclined surface part, and a flip-up lid 14 is attached to the inclined surface part. The lid 14 is openable and closable between a closed position illustrated in FIG. 1 and an opening position illustrated in FIG. 2. The lid 14 is constituted of an opening part 14A in a substantially half portion on one side and a cover part 14B in the remaining portion.

A touch panel 15 equivalent to a display unit is attached to the front upper part of the apparatus body 10A. The touch panel 15 is at a position corresponding to the opening part 14A of the lid 14 in a state illustrated in FIG. 1 where the lid 14 is at the closed position. For this reason, even in a case where the lid 14 is at the closed position, display of the touch panel 15 can be visually recognized via the opening part 14A, and the touch panel 15 can be operated.

Operation instructions from users, such as medical staffs, are input to the touch panel 15, and information on biochemical analysis is displayed on the touch panel 15. As the operation instructions, there are input instructions for orders of the biochemical analysis, a start instruction for the analysis, a display instruction for analysis results, a movement instruction for the sample tray 13, and the like. As the information on the biochemical analysis, there are orders, progress situations of the analysis, analysis results, replenishment guides of consumables to be described below, and the like.

The front upper part of the apparatus body 10A corresponding to the cover part 14B of the lid 14 is provided with an opening part 16 that leads to the sample tray 13. In a case where the lid 14 is at the closed position illustrated in FIG. 1, the opening part 16 is completely covered with the cover part 14B of the lid 14. In a case where a lid 14 is at the open position illustrated in FIG. 2, the opening part 16 is opened, this allows a user to access the sample tray 13 via the opening part 16, and it is possible to install the sample container 11 and the cartridge 12 and replenish the consumables. In addition, reference sign 17 of a front lower part of the apparatus body 10A designates a discard box in which a used dry analysis element 25 and the like are collected in a discardable manner.

In addition to the sample tray 13, a spotting mechanism 18, a spotting unit 19, a first measuring unit 20, a second measuring unit 21 (refer to FIG. 5), and the like are accommodated within the apparatus body 10A. The spotting mechanism 18 has a dispenser 22, and the sample is spotted on the dry analysis elements 25 in the spotting unit 19, using the dispenser 22. The first measuring unit 20 and the second measuring unit 21 receive the dry analysis elements 25 on which the sample has been spotted, and measure numerical values (the amounts of contained components) regarding measurement items according to the contained components of the sample.

Figure 3:
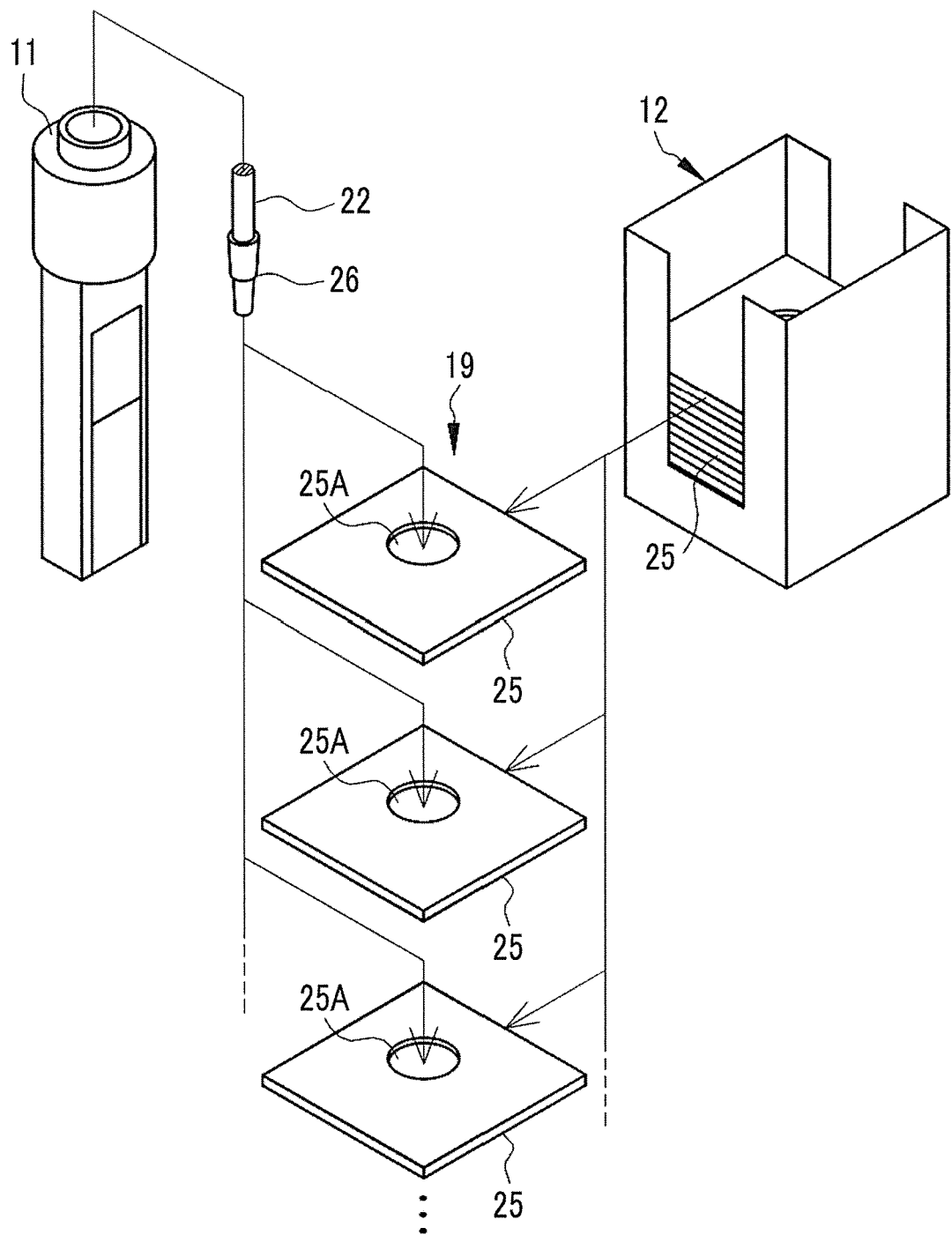
FIG. 3 is a view schematically illustrating an aspect of spotting of a sample in a spotting unit.

FIG. 3 is a view schematically illustrating an aspect of spotting of a sample in the spotting unit 19. The cartridge 12 accommodates a plurality of slide-like dry analysis elements 25. A round recessed spotting hole 25A into which the sample is to be spotted is formed at the center of each dry analysis element 25.

The dry analysis elements 25 are sequentially supplied from the cartridge 12 to the spotting unit 19 by a supply mechanism (not illustrated). Meanwhile, the sample is suctioned from the sample container 11 by the dispenser 22 having a nozzle tip 26 attached to a tip thereof. Then, in the spotting unit 19, the sample is discharged from the dispenser 22 toward the spotting holes 25A. The supply of the dry analysis elements 25 to the spotting unit 19, the suction of the sample from the sample container 11, and the discharge of the sample to the spotting holes 25A are repeated by the number of the dry analysis elements 25. Accordingly, the sample is sequentially spotted on the plurality of dry analysis elements 25.

As illustrated in Table 30 of FIG. 4, the plurality of dry analysis elements 25 are prepared for every plural measurement items according to a plurality of contained components of the sample. In other words, one dry analysis element 25 is prepared in order to measure the numerical value of one measurement item. For this reason, in the first measuring unit 20 and the second measuring unit 21, numerical values are sequentially measured regarding the plurality of measurement items corresponding to the plurality of dry analysis elements 25 on which the sample has been spotted.

As the measurement items, there are a plurality of types according to methods (a colorimetric method and a potential difference measurement method) and purposes (general chemical examination, enzyme examination, and the like) of the biochemical analysis. Specific examples of the measurement items include glucose (blood sugar), total cholesterol, creatinine, albumin, lactate dehydrogenase, sodium, potassium, lipase, and the like. The user selects the dry analysis elements 25 to be used in accordance with the methods and purposes of the biochemical analysis. In addition, the dry analysis elements 25 illustrated in FIG. 3 exemplify a colorimetric type to be used for the colorimetric method. In the case of the dry analysis elements 25 of an electrolyte type to be used for the potential difference measurement method, spotting holes for a reference solution to be described below are formed in addition to the spotting holes 25A for the sample.

Item codes indicating corresponding measurement items are attached to the respective dry analysis elements 25 in the form of bar codes or the like. The spotting unit 19 is provided with a reader (not illustrated), such as a charge coupled device (CCD) that reads the item codes. The biochemical analysis apparatus 10 recognizes the measurement items of the respective dry analysis elements 25 with the item codes read by the reader.

Figure 5:
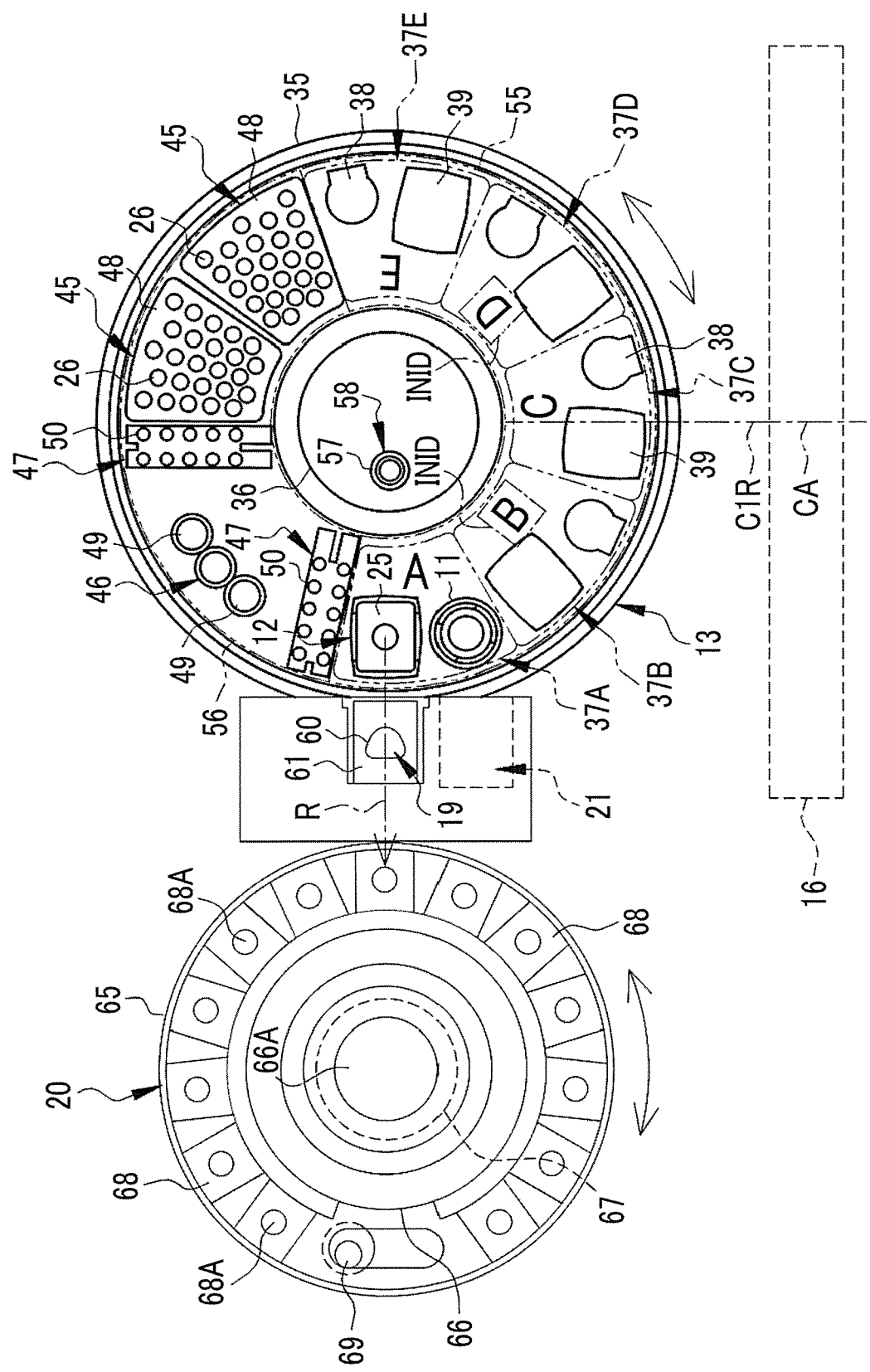
FIG. 5 is a plan view illustrating the inside of the biochemical analysis apparatus.

In FIG. 5, the sample tray 13 is circular, and is constituted of a rotary disk 35 at an outer peripheral part thereof and a non-rotating part 36 at a central part thereof. The rotary disk 35 is annular and opens at a central part thereof, and the non-rotating part 36 is disposed in the opening. The rotary disk 35 is rotationally driven around an axis thereof. The non-rotating part 36 is disk-shaped, and is fixed to a central part of the sample tray 13 without rotating literally.

Five sample installation parts 37A, 37B, 37C, 37D, and 37E are provided in the rotary disk 35 in order to collectively perform a plurality of sample analysis orders, as illustrated by divisions of two-dot chain lines. A sample container installation hole 38 in which the sample container 11 is installed and a cartridge installation hole 39 in which the cartridge 12 is installed are formed in each of the sample installation parts 37A to 37E. Alphabets "A", "B", "C", "D", and "E" as installation part-identification information for identifying the sample installation parts 37A to 37E, respectively, are attached to the sample installation parts 37A to 37E as indicated by reference sign INIDs and one-dot chain lines. In addition, in the following, in a case where it is not necessary to distinguish particularly, the sample installation parts 37A to 37E are collectively denoted as the sample installation parts 37.

FIG. 5 illustrates a state where the sample container 11 and the cartridge 12 are respectively installed in the sample container installation hole 38 and the cartridge installation hole 39 of the sample installation part 37A to which alphabet "A" is attached. In this way, one sample container 11 is installed in a set with one cartridge 12 in one sample installation part 37. For this reason, a sample installation part 37 and a sample and the sample installation part 37 and a patient or a hospitalized animal from which the sample is collected are in one-to-one correspondence.

In the rotary disk 35, two nozzle tip installation parts 45, three diluting solution installation parts 46, and two mixing cup installation parts 47 are provided as consumables installation parts in which the consumables to be used for the biochemical analysis are installed in addition to the sample installation parts 37. A tip rack 48 that accommodates a number of (twenty five in the present example) the nozzle tips 26 side by side is installed in each nozzle tip installation part 45. A diluting solution container 49, which accommodates a diluting solution for diluting the sample, is installed in each of the diluting solution installation parts 46. A plurality of (ten in the present example) mixing cups 50 for mixing the sample with the diluting solution is installed in each mixing cup installation part 47.

The sample installation parts 37, the nozzle tip installation parts 45, the diluting solution installation parts 46, and the mixing cup installation parts 47 are disposed in an arcuate shape on the rotary disk 35. Additionally, the sample installation parts 37 are collectively disposed in a first region 55 that is about half of the rotary disk 35, and the nozzle tip installation parts 45, the diluting solution installation parts 46, and the mixing cup installation parts 47 are collectively disposed in a second region 56 that is the remaining region excluding the first region 55. That is, regions where the sample installation parts 37 and the consumables installation parts are disposed are clearly divided.

In FIG. 5, the rotary disk 35 of the sample tray 13 is at a position where a center C1R of the first region 55 indicated by a one-dot chain line coincides with a center CA of the opening part 16 also indicated by a one-dot chain line. That is, the rotary disk 35 is at a position where the sample installation parts 37 are disposed on the opening part 16 side. Hereinafter, the position illustrated in FIG. 5 is defined as a normal position.

Figure 6:
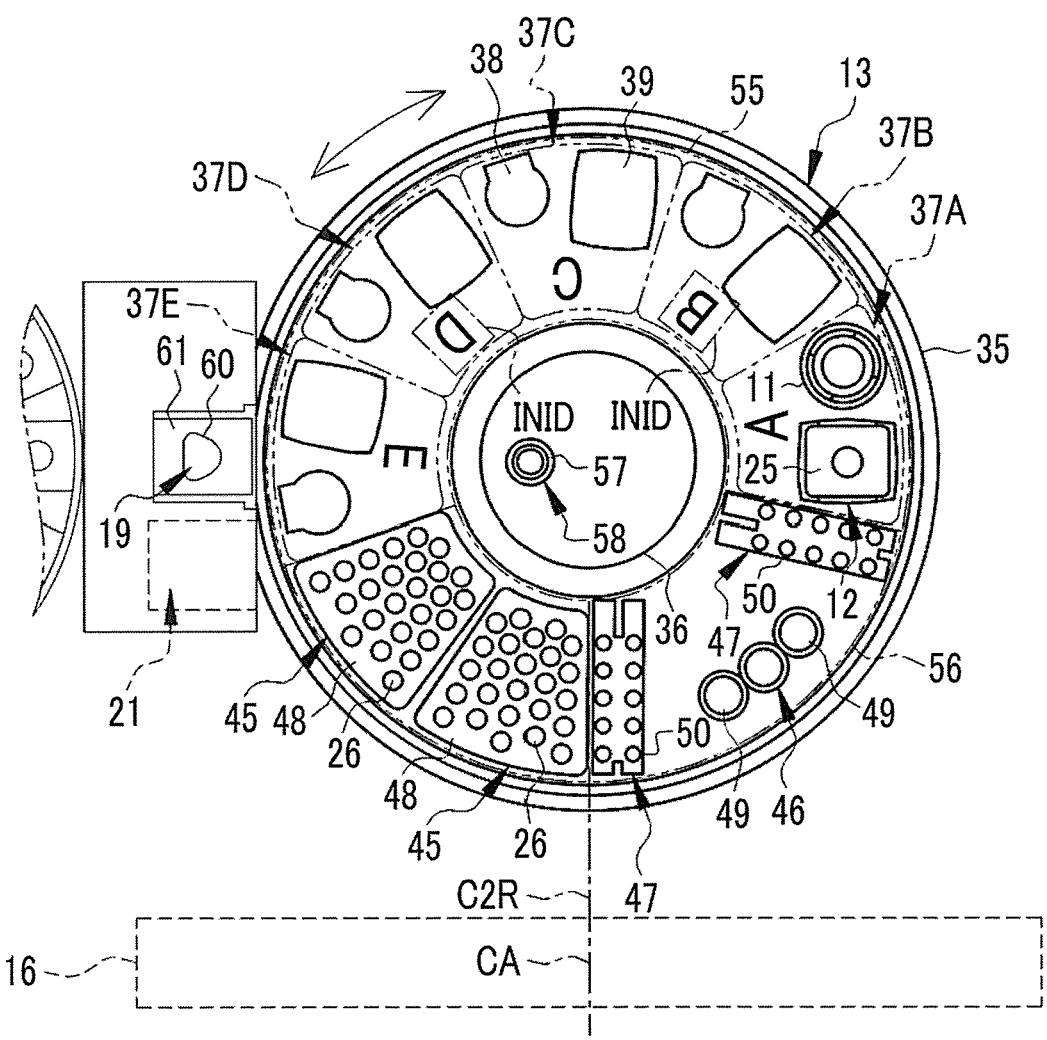
FIG. 6 is a plan view illustrating a sample tray at a consumables replenishment position.

Meanwhile, as illustrated in FIG. 6, the rotary disk 35 moves to a position where a center C2R of the second region 56 indicated by a one-dot chain line coincides with the center CA of the opening part 16 also indicated by the one-dot chain line. That is, the rotary disk 35 moves to a position where the consumables installation parts (the nozzle tip installation parts 45, the diluting solution installation parts 46, and the mixing cup installation parts 47) are disposed on the opening part 16 side. Hereinafter, the position illustrated in FIG. 6 is defined as a consumables replenishment position.

A reference solution installation part 58, in which a reference solution container 57 accommodating the reference solution is installed, is provided as a consumables installation part in the non-rotating part 36.

Each nozzle tip 26 is detached from each nozzle tip installation part 45, is mounted on the tip of the dispenser 22 as mentioned above, and is used for the spotting or the like of the sample. The diluting solution is used in a case where the sample has a concentration equal to or higher than a predetermined value, and cannot be analyzed as it is. In a case where the diluting solution is used, first, the sample is suctioned from the sample container 11 by the spotting mechanism 18 and is dispensed to the mixing cups 50. Next, the diluting solution is suctioned from each diluting solution container 49 and discharged to the mixing cups 50, and the sample and the diluting solution are mixed with each other. Then, the sample diluted with the diluting solution is spotted on the spotting holes 25A of the dry analysis elements 25. The reference solution is used in the case of the potential difference measurement method. The reference solution is suctioned from the reference solution container 57 by the spotting mechanism 18, and is spotted on the dry analysis elements 25 together with the sample in the spotting unit 19.

In FIG. 5, the spotting unit 19 is provided with an element holder 61 in which a spotting opening 60 is formed. In the element holder 61, the dry analysis elements 25 are sequentially supplied along a supply path R indicated by an arrow of a one-dot chain line from the cartridge 12 installed in the cartridge installation hole 39 of each sample installation part 37 that faces the spotting unit 19. The sample is spotted via the spotting opening 60 on the dry analysis elements 25 supplied to the element holder 61. In addition, although not illustrated, a nozzle tip discard port, which leads to a discard box 17 and to which used nozzle tips 26 are dropped and discarded, is provided between the spotting unit 19 and the first measuring unit 20.

The first measuring unit 20 and the second measuring unit 21 are thermostats (incubators) that have heating means (not illustrated), such as a heater, and performs heating with the heating means to keep a temperature constant. The first measuring unit 20 receives the colorimetric type dry analysis elements 25, and performs measurement by the colorimetric method. The second measuring unit 21 receives the electrolyte type dry analysis elements 25, and performs measurement by the potential difference measurement method. The colorimetric type dry analysis elements 25 are kept at a constant temperature for a predetermined time by the first measuring unit 20, and thereby, a coloration reaction (chromogenic reaction) occurs in the sample spotted on the spotting holes 25A.

The first measuring unit 20 comprises an annular rotating member 65 at an outer peripheral part thereof. An inverted-conical inclined rotating cylinder 66 is anchored to an inner peripheral part of the rotating member 65. A bearing 67 is attached to a lower part of the inclined rotating cylinder 66, and the rotating member 65 is supported by the bearing 67 and is rotatable. A plurality of element storage chambers 68 that store the plurality of dry analysis elements 25 are disposed in an arcuate shape in the rotating member 65. A circular photometric window 68A is formed at the center of each element storage chamber 68.

A photometric head 69 is disposed at one corner of the lower part of the rotating member 65. The photometric head 69 measures the reflective optical density of the sample of the dry analysis element 25 stored in each element storage chamber 68 through the photometric window 68A. More specifically, the photometric head 69 radiates measurement light to the sample of the spotting hole 25A, in which the coloration reaction has occurred, via the photometric window 68A moved to a facing position by the rotation of the rotating member 65, and measures the reflected light. After the measurement, the dry analysis element 25 is pushed out from the element storage chamber 68 by a discarding mechanism (not illustrated), and is dropped and discarded into an inner hole 66A of the inclined rotating cylinder 66 that leads to the discard box 17.

The second measuring unit 21 has a potentiometric probe (not illustrated). The potentiometric probe comes into contact with an electrolyte type dry analysis element 25 to measure the ion activity of specific ions, such as sodium, which is contained in the sample spotted on the electrolyte type dry analysis element 25. Even in this case, similarly to the case of the colorimetric type, after the measurement, the dry analysis element 25 is transferred from the second measuring unit 21 to an element discard port (not illustrated) leading to the discard box 17 and is discarded.

Figure 7:
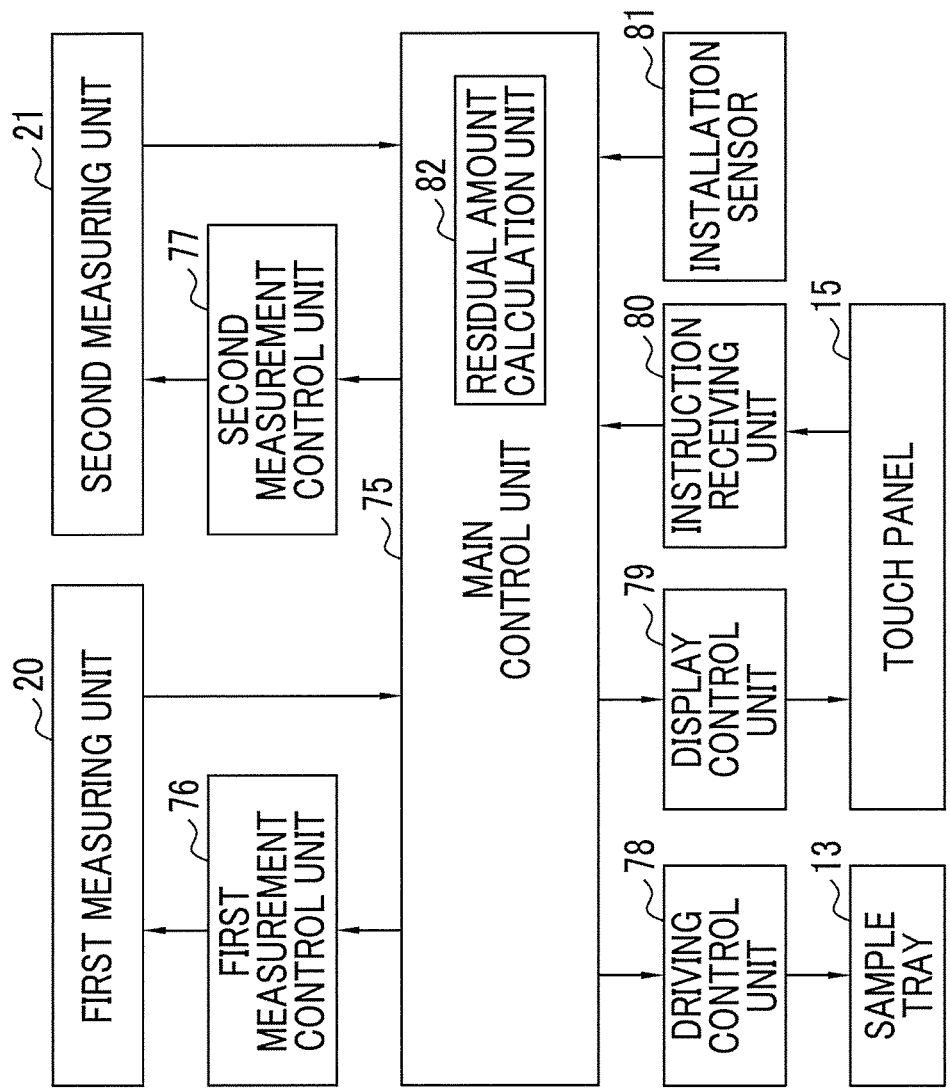
FIG. 7 is a block diagram of the biochemical analysis apparatus.

In FIG. 7, a main control unit 75 integrally controls the entire biochemical analysis apparatus 10. A first measurement control unit 76, a second measurement control unit 77, a driving control unit 78, a display control unit 79, an instruction receiving unit 80, and an installation sensor 81 are connected to the main control unit 75. Additionally, the main control unit 75 is provided with a residual amount calculation unit 82.

The first measurement control unit 76 controls driving of the heating means of the first measuring unit 20 and the rotation of the rotating member 65, and controls driving of the photometric head 69 to cause the photometric head 69 to measure the reflective optical density of the sample. The second measurement control unit 77 controls driving of the heating means of the second measuring unit 21, and controls driving of the potentiometric probe to cause the potentiometric probe to measure the ion activity of the sample.

The first measuring unit 20 outputs numerical values, indicating the amounts of contained components of the sample according to the reflective optical density measured by the photometric head 69, to the main control unit 75. Similarly, the second measuring unit 21 outputs numerical values, indicating the amounts of contained components of the sample according to the ion activity measured by the potentiometric probe, to the main control unit 75. The main control unit 75 outputs the numerical values to the display control unit 79.

The driving control unit 78 controls driving of the sample tray 13. In practice, the driving control unit 78 is a driver of a motor (not illustrated) that rotationally drives the rotary disk 35 of the sample tray 13 around an axis thereof.

The main control unit 75 counts the elapsed time from the start of the biochemical analysis for the sample installed in each of the sample installation parts 37A to 37E. The main control unit 75 detects the end of the biochemical analysis of the sample installed in the relevant sample installation part 37 in a case where the elapsed time reaches a required time for the biochemical analysis and the measurement is ended in the first measuring unit 20 or the second measuring unit 21. In a case where the main control unit 75 has detected the end of the biochemical analysis, it is possible to take out the sample container 11 and the cartridge 12 from the relevant sample installation part 37, and install new sample container 11 and cartridge 12. In addition, the required time is a time that varies in accordance with the methods and purposes of the biochemical analysis, and is known.

The display control unit 79 controls display of various screens to the touch panel 15. The instruction receiving unit 80 receives operation instructions input from the user via the touch panel 15.

The installation sensor 81 is, for example, a reflective optical sensor including a light emitter and a light receiver, and detects the presence or absence of installation of the sample containers 11 to the sample container installation holes 38 of the sample installation parts 37 and the presence or absence of installation of the cartridges 12 to the cartridge installation holes 39. Additionally, the installation sensor 81 are also provided in the consumables installation parts including the nozzle tip installation parts 45, the diluting solution installation parts 46, the mixing cup installation parts 47, and the reference solution installation part 58, and also detects the presence or absence of installation of respective consumables to the consumables installation parts. The main control unit 75 outputs detection results of the installation sensor 81 to the display control unit 79.

The residual amount calculation unit 82 calculates residual amounts RA (refer to FIG. 9) of the consumables. Specifically, the residual amount calculation unit 82 subtracts the numbers of used consumables from full replenishment numbers (twenty five in the case of the nozzle tips 26 and ten in the case of the mixing cups 50) of consumables in the consumables installation parts to calculate the residual amounts RA. The residual amount calculation unit 82 outputs the calculated residual amounts RA to the display control unit 79.

In addition to these, a driving control unit of the spotting mechanism 18, a driving control unit of a supply mechanism that supplies the dry analysis elements 25 from the cartridge 12 to the spotting unit 19, a plasma filtration unit (not illustrated) that extracts plasma components from whole blood that is a sample, a driving control unit of a centrifugal separation unit (not illustrated), or the like is connected to the main control unit 75 by the display control unit 79.

Figure 8:
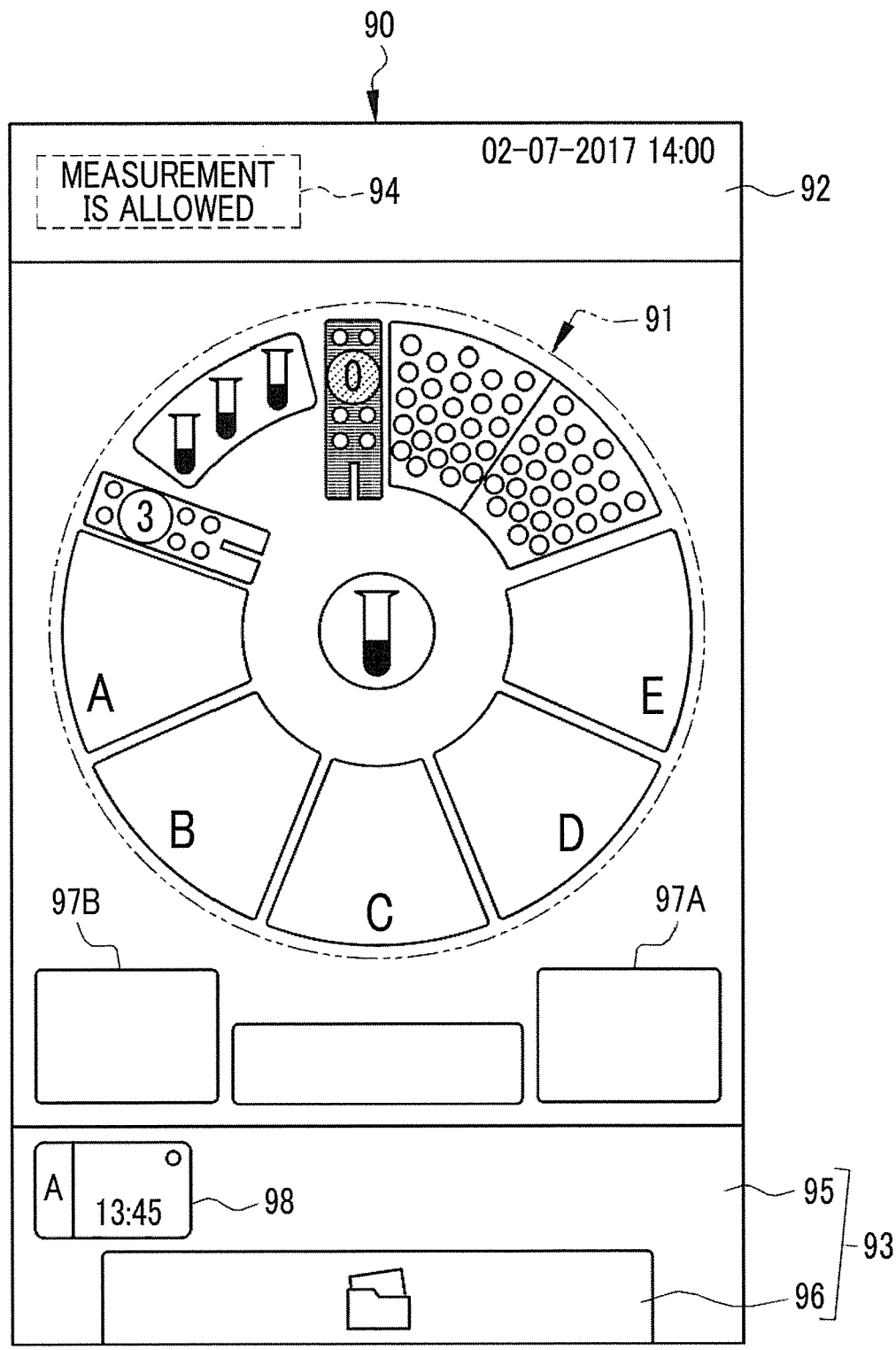
FIG. 8 is a view illustrating a main screen.

FIG. 8 illustrates a main screen 90 to be displayed on the touch panel 15. A layout diagram 91 is displayed substantially at the center of the main screen 90. A message display region 92 is disposed at an upper part of the main screen 90, and a result display switching region 93 is disposed at a lower part of the main screen 90. A message 94 indicating the progress situations of the biochemical analysis and current data and time are displayed on the message display region 92. The result display switching region 93 is provided with a call button display region 95 and a summary display button 96. Additionally, button display regions 97A and 97B are provided between the layout diagram 91 and the result display switching region 93.

A call button 98 for displaying results of the biochemical analysis for each sample is operably displayed on the call button display region 95. In a case where the call button 98 is operated, the instruction receiving unit 80 receives a display instruction for the analysis results. In a case where the display instruction for the analysis results is received by the instruction receiving unit 80, the display control unit 79 displays a result display screen (not illustrated) instead of the main screen 90 on the touch panel 15. Numerical values of a plurality of measurement items are displayed side by side on the result display screen. The user can confirm the results of the biochemical analysis through the result display screen. In addition, in a case where the summary display button 96 is operated, the display control unit 79 displays a result display screen (not illustrated) capable of browsing all past results including all results on the day on the touch panel 15.

A flag "START" is retractably displayed on the button display region 97A. In a case where the flag "START" is displayed, the button display region 97A functions as a start button giving an instruction for the start of the analysis. In a case where the button display region 97A is operated in a state where the flag "START" is displayed, the instruction receiving unit 80 receives the analysis start instruction.

Figure 10:
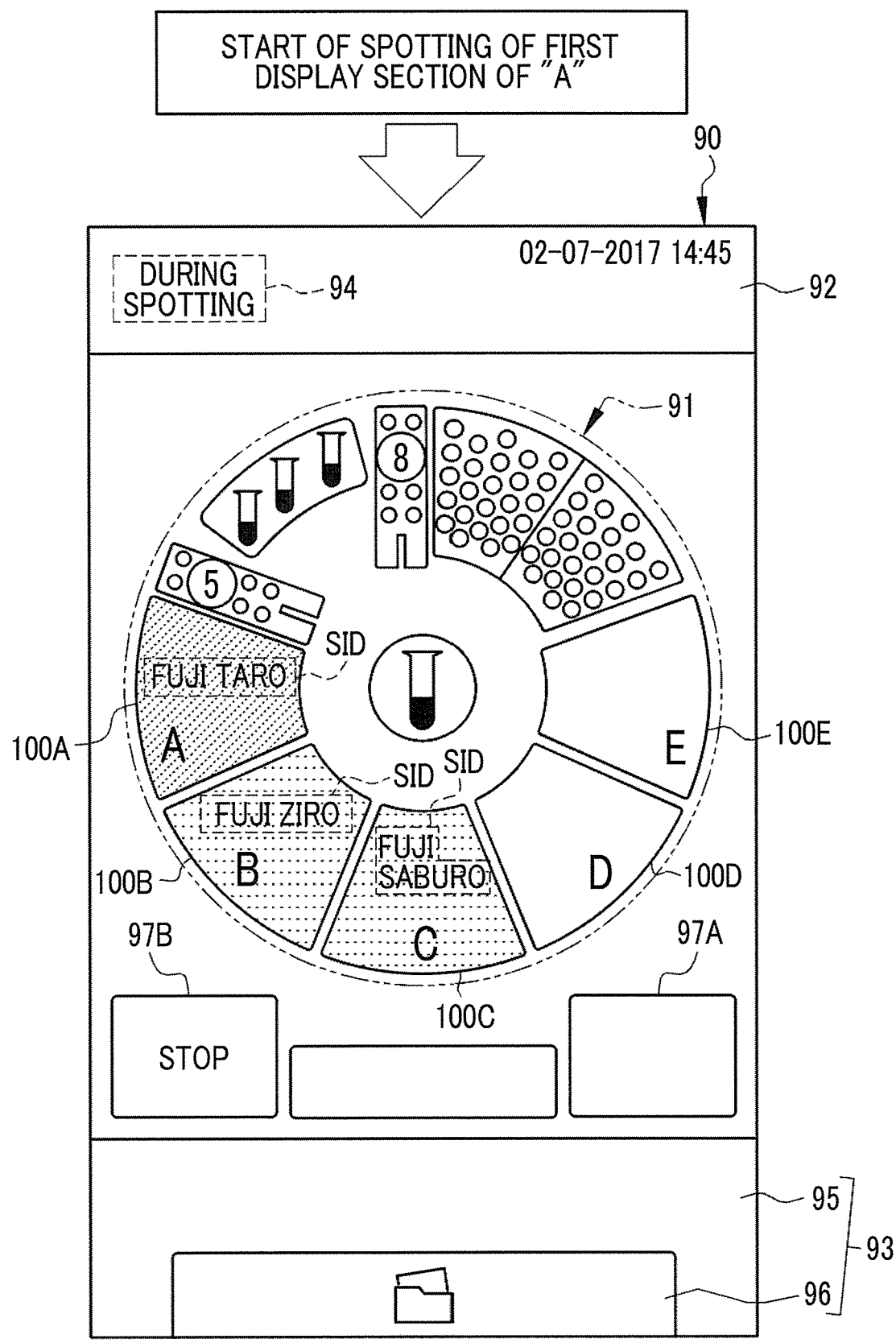
FIG. 10 is a view illustrating the main screen in a case where the spotting is started.

Meanwhile, a flag "STOP" is retractably displayed on the button display region 97B (refer to FIG. 10). In a case where the flag "STOP" is displayed, the button display region 97B functions as a stop button giving an instruction for the stop of the analysis. In a case where the button display region 97B is operated in a state where the flag "STOP" is displayed, the instruction receiving unit 80 receives the analysis stop instruction. In a case where the analysis stop instruction is received by the instruction receiving unit 80, the main control unit 75 stops the analysis.

Figure 9:
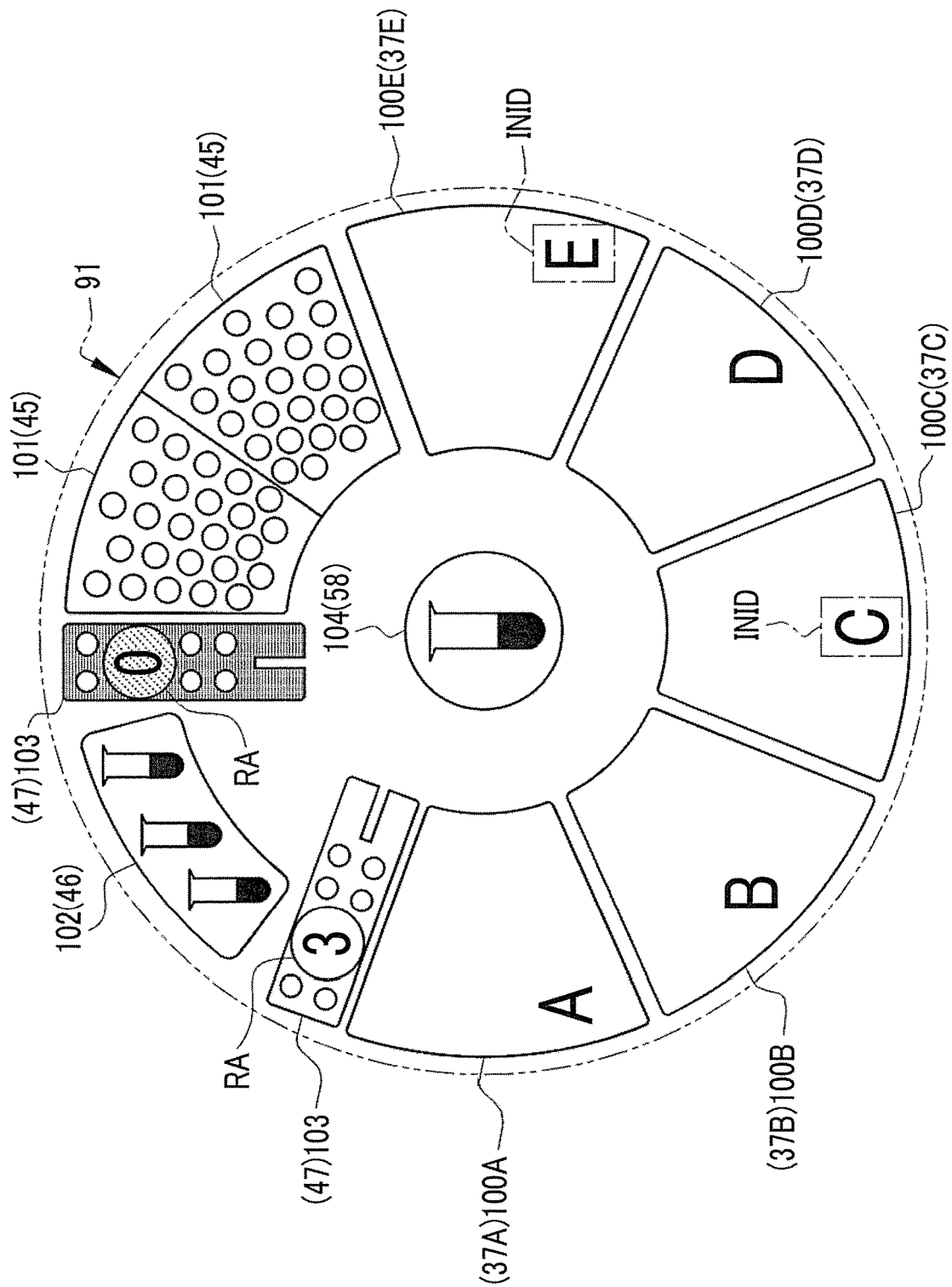
FIG. 9 is an enlarged view of a layout diagram.

As illustrated in an enlarged manner in FIG. 9, the layout diagram 91 schematically illustrates an array state of the sample installation parts 37 and the consumables installation parts (the nozzle tip installation parts 45, the diluting solution installation parts 46, the mixing cup installation parts 47, and the reference solution installation part 58) in the rotary disk 35 of the sample tray 13. Specifically, the layout diagram 91 is provided with first display sections 100A, 100B, 100C, 100D, and 100E corresponding to the sample installation parts 37A to 37E, and second display sections 101, 102, 103, and 104 corresponding to the consumables installation parts. Installation part-identification information INID is attached to the first display sections 100A to 100E, similarly to the sample installation parts 37A to 37E.

In FIG. 9, reference signs of corresponding installation parts are attached to reference signs of the respective display sections in parentheses in order to clarify a correspondence relationship between the respective display sections and the respective installation parts. In addition, in the following, similarly to the sample installation parts 37, the first display sections 100A to 100E may be collectively denoted as the first display sections 100.

As illustrated on the second display section 103 corresponding to the mixing cup installation parts 47, the display control unit 79 displays a residual amount RA of the mixing cups 50. That is, the display control unit 79 is equivalent to the first display control unit.

In a case where the residual amount RA is zero as in the second display section 103 at a 12 o'clock position, the display control unit 79 paints the residual amount RA in a specific color (for example, red) as illustrated by hatching, and paints the second display section 103 in a specific color (for example, pink). That is, the second display section 103 in a case where the residual amount RA of the mixing cup 50 is zero is displayed separately from a second display section 103 (a second display section 103 at a 10 o'clock position in FIG. 9) of which a residual amount RA is not zero.

Regarding the second display sections 101, 102, and 104 corresponding to consumables installation parts excluding the mixing cup installation parts 47, the display control unit 79 does not display the residual amounts RA. However, in a case where the residual amount RA reaches zero, similarly to the second display section 103 at the 12 o'clock position, the display control unit 79 paints the second display sections 101, 102, and 104 in pink.

The first display sections 100 function as operation buttons that can be operated by the user's fingers. In a case where a first display section 100 is operated, the display control unit 79 displays an order screen (not illustrated) related to orders for the biochemical analysis of the sample installed in a sample installation part 37 corresponding to the operated first display section 100 instead of the main screen 90 on the touch panel 15. The user inputs orders including sample IDs (identification data) for identifying the sample through the order screen, and gives input instructions for the orders to the instruction receiving unit 80. In addition, the sample IDs are, for example, Romanic notations of the names of patients or hospitalized animals from which samples are collected (refer to FIG. 10).

In a case where the order input instructions and the analysis start instruction are received by the instruction receiving unit 80, the main control unit 75 drives the installation sensor 81, and detects the presence or absence of installation of a sample container 11 and a cartridge 12 to the sample installation part 37 corresponding to the first display section 100 in which the order input instructions have been received by the instruction receiving unit 80.

In a case where the installation of the sample container 11 and the cartridge 12 to the sample installation part 37 corresponding to the first display section 100 in which the order input instructions have been received by the instruction receiving unit 80 is detected, the main control unit 75 drives the spotting mechanism 18 to start spotting. In a case where the sample containers 11 and the cartridges 12 are installed in all the sample installation parts 37A to 37E, firstly, the spotting is performed on the dry analysis elements 25 of the sample installation part 37A, then the spotting is sequentially performed on the dry analysis elements 25 of the sample installation part 37B and the dry analysis elements 25 of the sample installation part 37C, and finally, the spotting is performed on the dry analysis elements 25 of the sample installation part 37E. In this case, the rotary disk 35 of the sample tray 13 is rotationally driven under the control of the driving control unit 78 such that a sample installation part 37 as a spotting target faces the spotting unit 19.

Meanwhile, in a case where the installation of the sample container 11 and the cartridge 12 to the sample installation part 37 corresponding to the first display section 100 in which the order input instructions have been received by the instruction receiving unit 80 is not detected, the display control unit 79 displays a warning screen (not illustrated) prompting the installation of the sample container 11 and the cartridge 12 instead of the main screen 90 on the touch panel 15.

FIG. 10 is an example of display of the main screen 90 in a case where the spotting is started. In FIG. 10, the display control unit 79 changes the message 94 in the message display region 92 from "Measurement is allowed" in FIG. 8 to "During spotting". Additionally, a first display section 100 corresponding to a sample installation part 37 being currently spotted on a dry analysis element 25 and a first display section 100 corresponding to a sample installation part 37 waiting for spotting are painted in different colors (for example, in red-brown during spotting and in cream during waiting) as illustrated by hatching. This painting in specific colors also shows that the installation of a sample container 11 and a cartridge 12 to the relevant sample installation part 37 has been detected (the presence or absence of installation of a sample container 11 and a cartridge 12).

FIG. 10 illustrates a case where the installation of the sample containers 11 and the cartridges 12 to the sample installation parts 37A to 37C corresponding to the first display sections 100A to 100C are detected, the sample installation part 37A is being spotted, and the sample installation parts 37B and 37C are waiting. Here, reference signs SIDs indicated by being enclosed by broken lines are sample IDs. In addition, in FIG. 10, the measurement is not started, and the results of the biochemical analysis are not yet output. Thus, the call button 98 is not displayed on the call button display region 95 in accordance with an operation.

Figure 11:
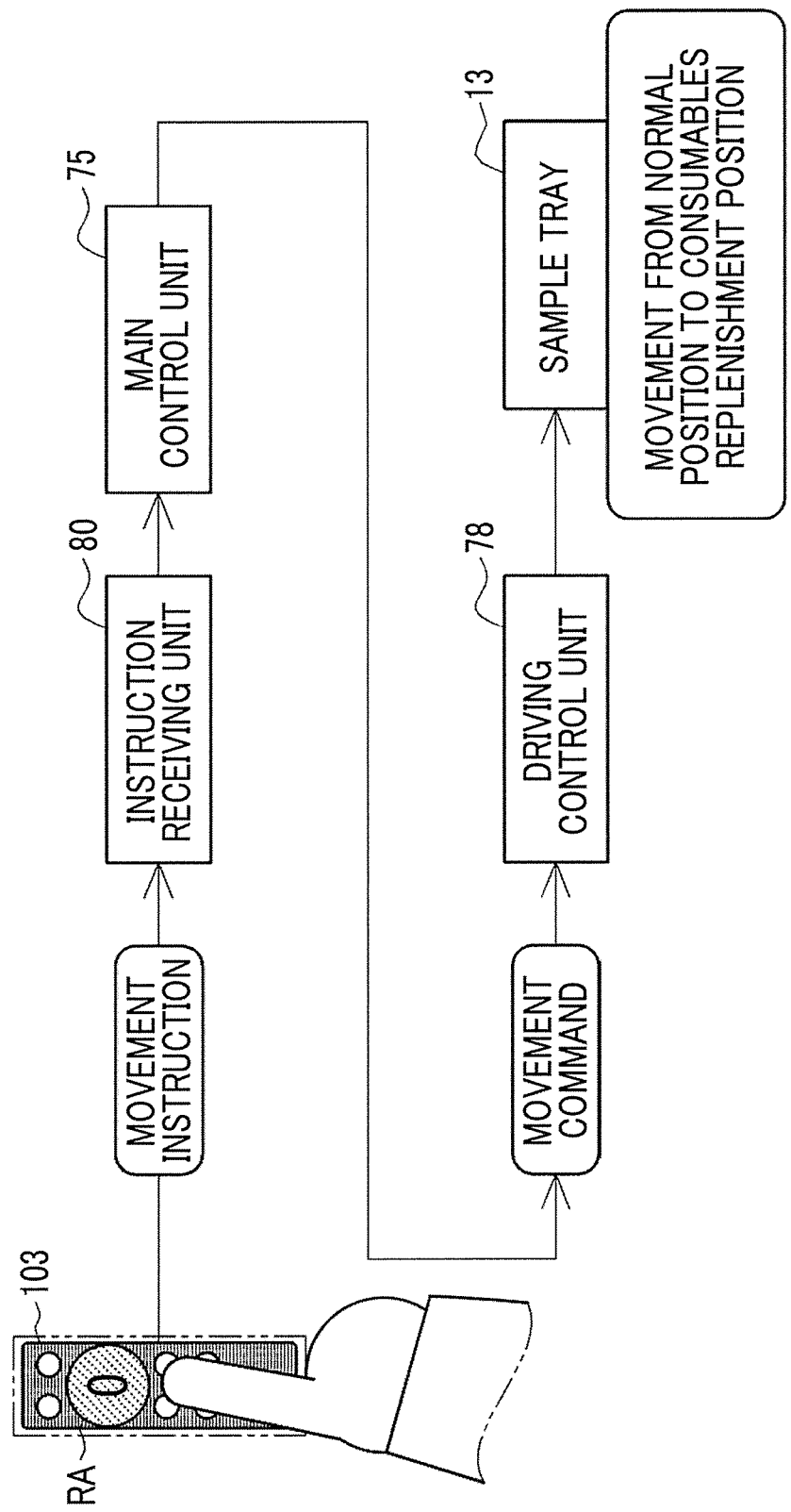
FIG. 11 is a view illustrating a flow of the processing until the sample tray moves to the consumables replenishment position from an operation of a second display section.

As illustrated in FIG. 11, in a case where the residual amounts RA of the consumables reach zero, the second display sections 101 to 104 (FIG. 11 illustrates the second display section 103) function as operation buttons that allow the user to operate with his/her fingers, similarly to the first display sections 100. In a case where the second display sections 101 to 104 are operated, the instruction receiving unit 80 receives the movement instruction for the sample tray 13. That is, the second display sections 101 to 104 are equivalent to a first driving button that outputs the movement instruction to the instruction receiving unit 80.

In a case where the movement instruction for the sample tray 13 is received by the instruction receiving unit 80, the main control unit 75 outputs a movement command for the sample tray 13 to the driving control unit 78. The driving control unit 78 receives the movement command to move the sample tray 13 from the normal position to the consumables replenishment position.

Figure 12:
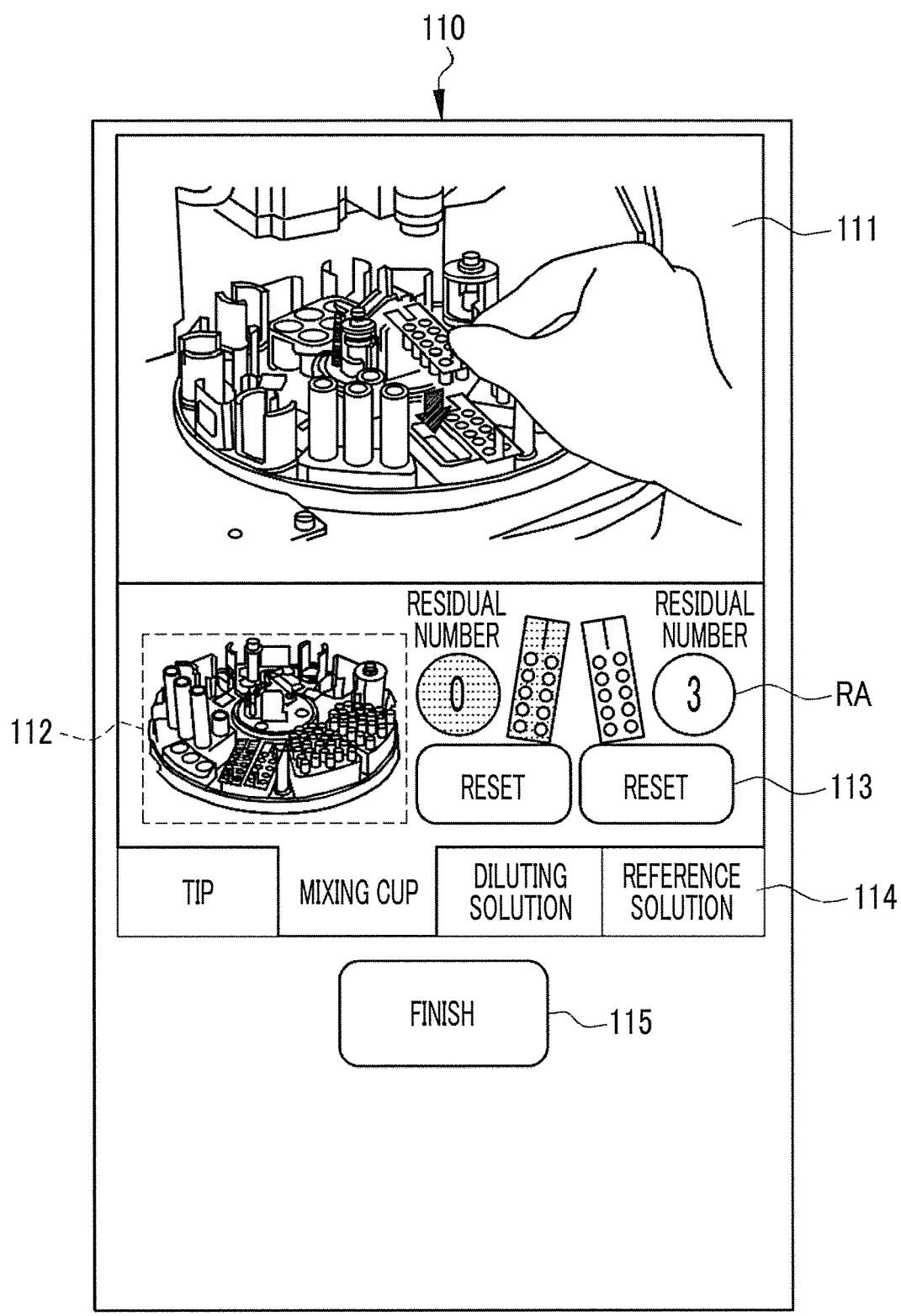
FIG. 12 is a view illustrating a guide screen.

Additionally, in a case where the movement instruction for the sample tray 13 is received by the instruction receiving unit 80, the display control unit 79 displays a guide screen 110 illustrated in FIG. 12 instead of the main screen 90 on the touch panel 15.

Replenishment guides 111 of the consumables are displayed at an upper part of the guide screen 110. The replenishment guides 111 are photographs or illustrations of the sample tray 13 at the consumables replenishment position taken from the opening part 16 side. In practice, an aspect in which the consumables are replenished with user's hands is displayed on the replenishment guides 111. FIG. 12 illustrates a case where the replenishment guides 111 indicating an aspect in which a second display section 103 is operated and a mixing cup installation part 47 corresponding to the second display section 103 is replenished with the mixing cups 50 are displayed, subsequent to the example of FIG. 11. In addition, the replenishment guides 111 may be moving images with voice guides without being limited to still images, such as photographs and illustrations.

A position display diagram 112 is displayed on a lower left side of the replenishment guides 111. The position display diagram 112 is a diagram indicating the position of consumables to be replenished. More specifically, the position display diagram 112 is a perspective view of the sample tray 13 in which the consumables (the mixing cups 50 in the present example) to be replenished is painted in a specific color (for example, in orange) as illustrated by hatching and are displayed separately from the other consumables.

The residual amounts RA are displayed on the right side of the position display diagram 112, similarly to the second display sections 103 of the layout diagram 91, and reset buttons 113 are displayed below the residual amounts RA. In a case where a reset button 113 is operated, the residual amount calculation unit 82 resets a residual amount RA, which has been calculated so far, to a full replenishment number.

Although the replenishment guides 111, the position display diagram 112, and the like regarding the mixing cups 50 are illustrated in FIG. 12, the replenishment guides 111, the position display diagram 112, and the like are prepared for every consumable, and it is possible to switch displays with lower tabs 114.

Additionally, since FIG. 12 illustrates the case where the second display section 103 corresponding to the mixing cup installation part 47 is operated, the replenishment guides 111, the position display diagram 112, and the like regarding the mixing cups 50 are displayed. However, in a case where the residual amounts RA of the other consumables reach zero and the second display sections corresponding to the installation parts of the other consumables are operated, the display control unit 79 displays the replenishment guides 111, the position display diagrams 112, and the like regarding the other consumables. For example, in a case where a residual amount RA of the nozzle tips 26 reaches zero, and a second display section 101 corresponding to a nozzle tip installation part 45 is operated, the replenishment guides 111, the position display diagram 112, and the like regarding the nozzle tips 26 (tip rack 48) are displayed instead of the replenishment guides 111, the position display diagram 112, and the like regarding the mixing cups 50 of FIG. 12.

Figure 13:
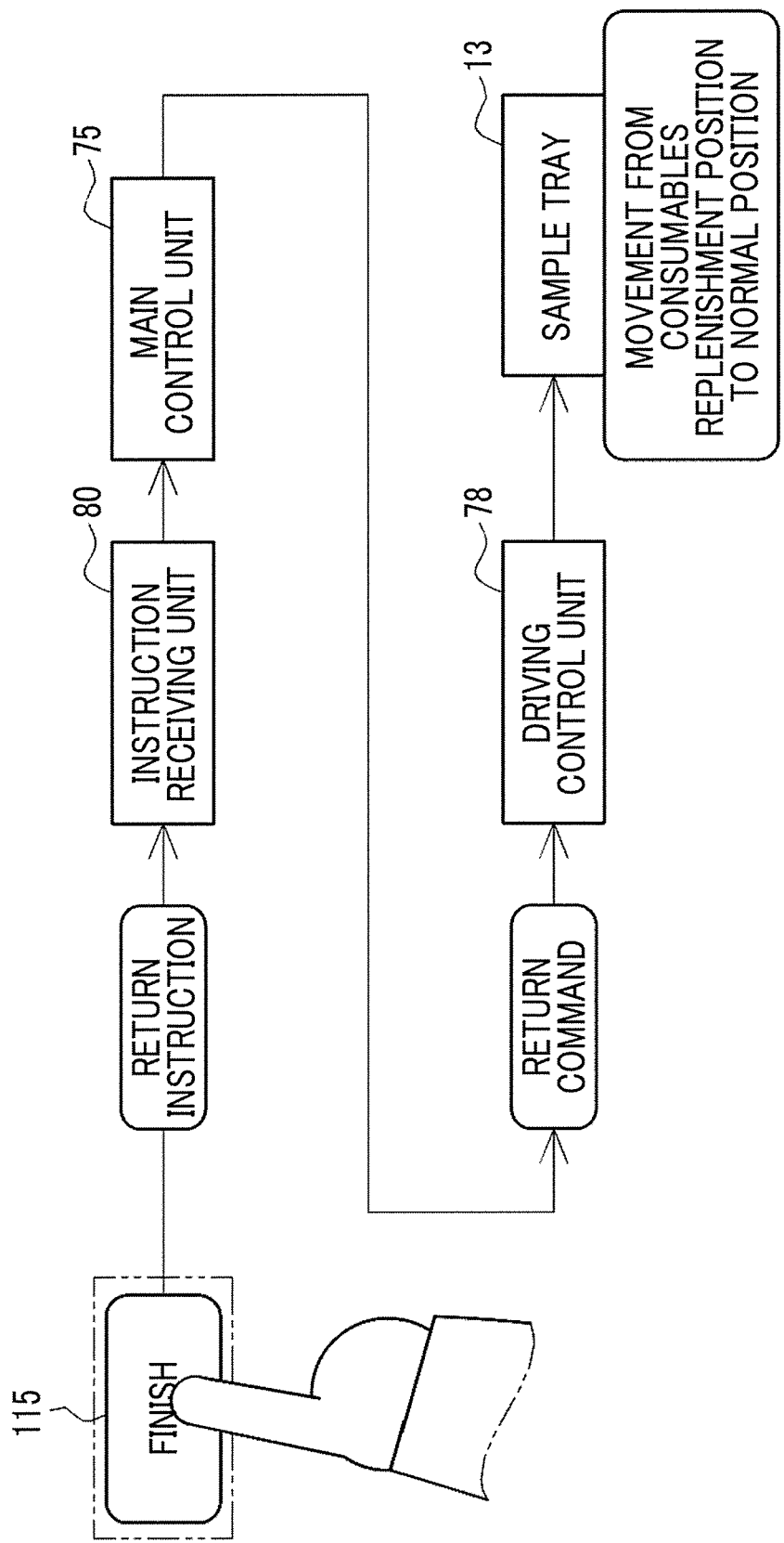
FIG. 13 is a view illustrating a flow of the processing until the sample tray moves to a normal position from an operation of a finish button.

A lowermost part of the guide screen 110 is provided with a finish button 115. As illustrated in FIG. 13, in a case where the finish button 115 is operated, the instruction receiving unit 80 receives a return instruction for the sample tray 13. That is, the finish button 115 is equivalent to a second driving button that outputs the return instruction to the instruction receiving unit 80 in accordance with an operation.

In a case where the return instruction for the sample tray 13 is received by the instruction receiving unit 80, the main control unit 75 outputs a return command for the sample tray 13 to the driving control unit 78. The driving control unit 78 receives the return command to move the sample tray 13 from the consumables replenishment position to the normal position.

Hereinafter, the operation of the above configuration will be described with reference to FIGS. 14 to 17. First, in FIG. 14, the user opens the lid 14 to open the opening part 16. Then, the sample containers 11, which accommodate samples collected from target patients or target hospitalized animals for the biochemical analysis, are installed in the sample container installation holes 38 via the opening part 16, and the cartridges 12, which accommodate the unused dry analysis elements 25, are installed in the cartridge installation holes 39 via the opening part 16 (Step ST100).

Figure 15:
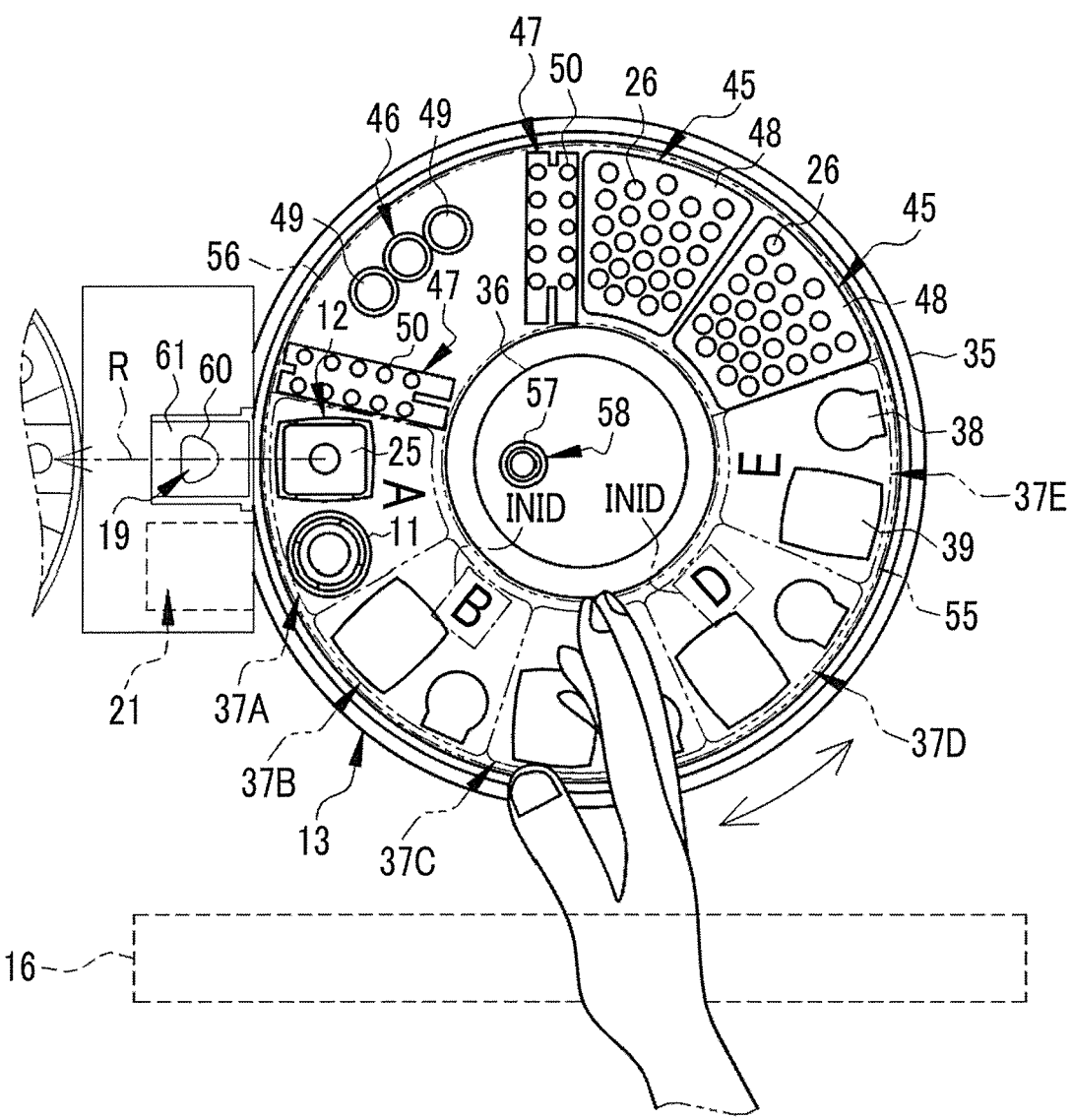
FIG. 15 is a view illustrating an aspect in which a user's hand makes an access to a sample installation part at the normal position.

In this case, the sample tray 13 is at the normal position. For this reason, as illustrated in FIG. 15, a user's hand makes an easy access to the sample installation parts 37. Hence, the user can easily install the sample containers 11 and the cartridge 12 in the sample installation parts 37.

Figure 14:
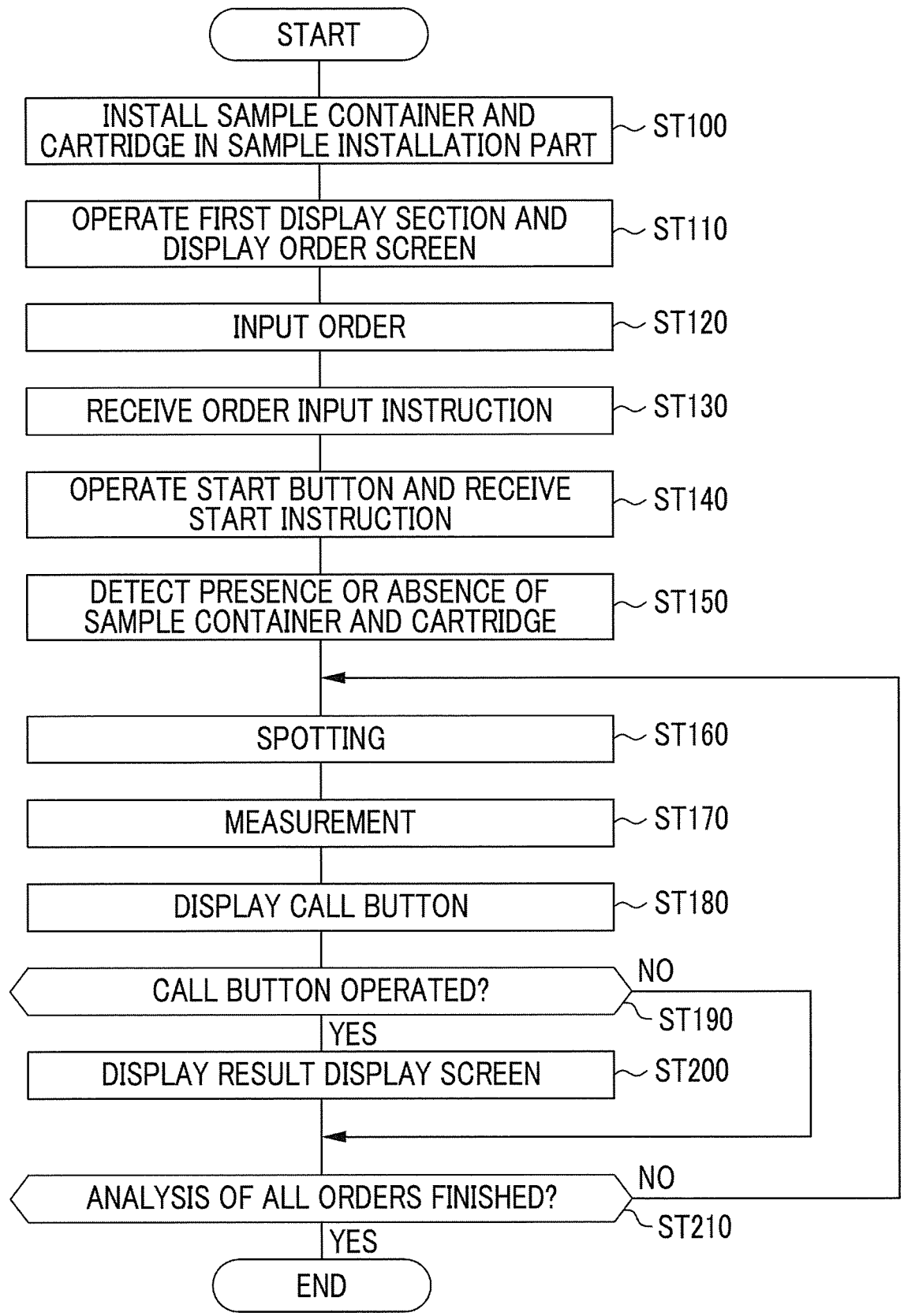
FIG. 14 is a flowchart illustrating a processing procedure for the biochemical analysis apparatus.

As illustrated in Step ST110 of FIG. 14, after the installation of the sample containers 11 and the cartridges 12, the user closes the lid 14, and operates the first display sections 100 of the main screen 90 corresponding to the sample installation parts 37 in which the sample containers 11 and the cartridges 12 are installed. In response to this operation, an order screen is displayed in place of the main screen 90 by the display control unit 79. The user inputs orders through the order screen (Step ST120). Accordingly, input instructions for the orders are received by the instruction receiving unit 80 (Step ST130).

After the input of the orders, the user operates the button display region 97A that functions as the start button. Accordingly, a start instruction for the analysis is received by the instruction receiving unit 80 (Step ST140).

In a case where the analysis start instruction is received by the instruction receiving unit 80, the presence or absence of installation of the sample containers 11 and the cartridges 12 to the sample installation parts 37 is detected by the installation sensor 81 under the control of the main control unit 75 (Step ST150). Next, spotting to the dry analysis elements 25 is performed by the spotting mechanism 18 (Step ST160). Subsequently, measurement of numerical values of respective measurement items is performed by the first measuring unit 20 and the second measuring unit 21 (Step ST170).

In a case where the measurement is started, the call button 98 is displayed on the call button display region 95 by the display control unit 79 (Step ST180). In a case where the call button 98 is operated (YES in Step ST190), the result display screen is displayed in place of the main screen 90 by the display control unit 79 (Step ST200). The series of processing from Step ST160 to Step ST200 are repeatedly continued until the analysis of all orders received in Step (ST130) ends (YES in Step ST210).

Figure 16:
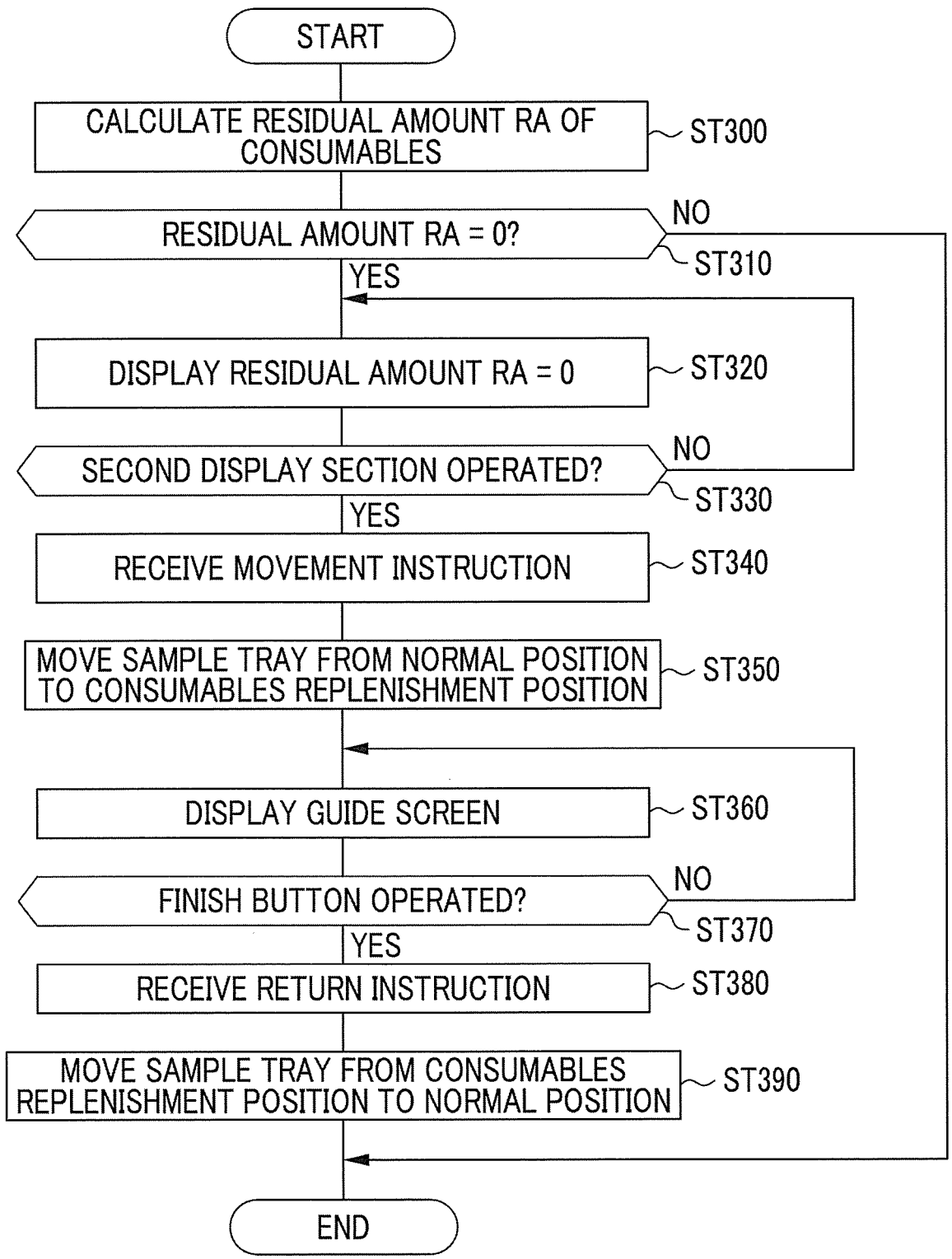
FIG. 16 is a flowchart illustrating a processing procedure for the biochemical analysis apparatus.

As illustrated in FIG. 16, in the residual amount calculation unit 82, the residual amounts RA of consumables are calculated (Step ST300). In a case where the residual amounts RA reach zero (YES in Step ST310) as illustrated in FIG. 9, the fact that the residual amounts RA are zero is displayed on the second display sections 101 to 104 by the display control unit 79 (Step ST320). Specifically, in the case of a second display section 103, the fact that the residual amount RA of the mixing cups 50 is zero is displayed by the residual amount RA itself and a display color. In the case of the second display sections 101, 102, and 104, the facts that the residual amounts of the nozzle tips 26, the diluting solutions, and the reference solution are zero are displayed in the display color.

The user views the display of the fact that the residual amounts RA are zero, and operates the displayed second display sections 101 to 104 (YES in Step ST330). Accordingly, the movement instruction for the sample tray 13 is received by the instruction receiving unit 80 (Step ST340, an instruction receiving step).

In a case where the movement instruction is received by the instruction receiving unit 80, as illustrated in FIG. 11, a movement command is output from the main control unit 75 to the driving control unit 78. Then, the sample tray 13 is moved from the normal position to the consumables replenishment position by the driving control unit 78 (Step ST350, a driving control step).

Figure 17:
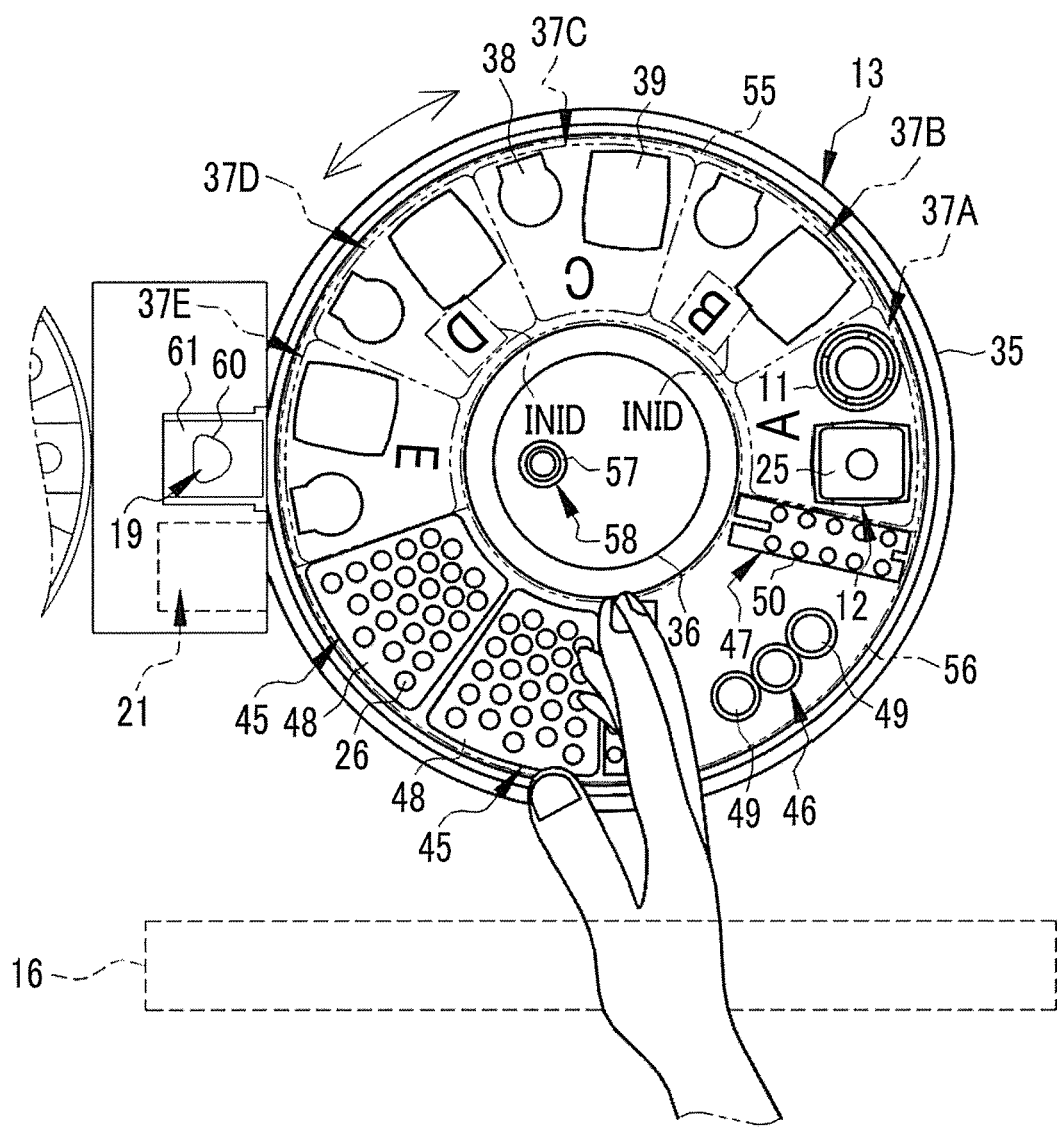
FIG. 17 is a view illustrating an aspect in which the user's hand makes an access to a consumables installation part at the consumables replenishment position.

In a case where the user intends to replenish the consumables at the normal position, it is necessary for the user to extend his/her hand across above the sample installation parts 37. For this reason, there is a concern that a sample may adhere to the user's hand or arm in a case where the consumables are replenished. In contrast, as illustrated in FIG. 17, the user's hand can make an access to a consumables installation part without crossing above the sample installation parts 37 at the consumables replenishment position. Hence, there is no concern that a sample may adhere to the user's hand or arm in a case where the consumables are replenished, and it is possible to maintain a sanitary condition of the user. Additionally, the user can easily replenish the consumables.

As illustrated in Step ST360 of FIG. 16, in a case where the movement instruction is received by the instruction receiving unit 80, the guide screen 110 is displayed in place of the main screen 90 by the display control unit 79 as illustrated in FIG. 12. The user operates the reset buttons 113 after the consumables are replenished in accordance with the replenishment guides 111 of the guide screen 110. Accordingly, the residual amounts RA, which have been calculated so far by the residual amount calculation unit 82, are reset to the full replenishment numbers.

After the operation of the reset buttons 113, the user further operates the finish button 115 (YES in Step ST370). Accordingly, a return instruction for the sample tray 13 is received by the instruction receiving unit 80 (Step ST380).

In a case where the return instruction is received by the instruction receiving unit 80, as illustrated in FIG. 13, a return command is output from the main control unit 75 to the driving control unit 78. Then, the sample tray 13 is moved from the consumables normal position to the replenish position by the driving control unit 78 (Step ST390).

Since the display control unit 79 schematically displays the array state of the sample installation parts 37 and the consumables installation parts 45 to 47 and 58 in the sample tray 13, displays the first display sections 100 corresponding to the sample installation parts 37 and displays the layout diagram 91 provided with the second display sections 101 to 104 corresponding to the consumables installation parts 45 to 47 and 58 on the touch panel 15, and causes the second display sections 101 to 104 to function as the first driving button that outputs the movement instruction to the instruction receiving unit 80, the operation is intuitive for the user and is easy for the user to understand.

Of course, the first driving button may be provided separately from the second display sections 101 to 104. Moreover, a physical button attached to the apparatus body 10A may be caused to function as the first driving button instead of an operation button to be displayed on the touch panel 15. Also in the second driving button, similarly, a physical button attached to the apparatus body 10A may be made to function as the second driving button instead of the illustrated finish button 115.

Since the display control unit 79 displays the residual amounts RA of the mixing cups 50 on the second display sections 103, the user can always confirm the residual amounts RA of the mixing cups 50, and can monitor a timing at which the mixing cups 50 are replenished.

In addition, not only the residual amounts RA of the mixing cups 50 but also the residual amounts RA of the nozzle tips 26, the diluting solutions, and the reference solution, which are the other consumables, may be displayed on the second display sections 101, 102, and 104. Additionally, the residual amounts RA may be displayed on, for example, exclusive screens or the like to be displayed instead of the main screen 90 separately from the second display sections 101 to 104.

In a case where the finish button 115 that functions as the second driving button is operated and the return instruction is received by the instruction receiving unit 80, the driving control unit 78 moves the sample tray 13 from the consumables replenishment position to the normal position. Thus, the sample tray 13 can be simply returned to the normal position by one-touch operation.

Since the plurality of consumables installation parts are collectively disposed in the second region 56, and the consumables replenishment position is a position where the center C2R of the second region 56 coincides with the center CA of the opening part 16, it is easy to equally make an access to any consumables installation parts in the consumables replenishment position. Additionally, since the consumables replenishment position is limited to one position, the driving control of the sample tray 13 is simple.

In addition, a position where the center of each consumables installation part coincides with the center of the opening part 16 may be set to the consumables replenishment position, and the consumables replenishment position may be provided for every plural consumables installation parts. In this case, for example, in a case where the residual amount RA of nozzle tips 26 is zero and the second display section 101 is operated, the sample tray 13 is moved to a position where the center of a nozzle tip installation part 45 coincides with the center CA of the opening part 16. Additionally, in a case where the residual amount RA of the mixing cups 50 is zero and the second display section 103 is operated, the sample tray 13 is moved to a position where the center of a mixing cup installation part 47 coincides with the center CA of the opening part 16.

Here, the "coincidence position" includes not only a case where the positions of the centers completely coincide with each other but also a case where deviation between the positions of the centers falls within a certain degree of allowable range (for example, ±10° or the like).

In addition, the consumables replenishment position may be a position where the consumables installation parts are disposed on the opening part 16 side, and may not necessarily be the position where the center C2R of the second region 56 coincides with the center CA of the opening part 16 or the position where the center of each consumables installation part coincides with the center of the opening part 16.

Second Embodiment

In the above first embodiment, in a case where the second display sections 101 to 104 equivalent to the first driving button is operated, the sample tray 13 may be moved from the normal position to the consumables replenishment position. However, the invention is not limited to this. As in the second embodiment illustrated in FIGS. 18 to 20, in a case where an error regarding the consumables is detected, the sample tray 13 may be moved from the normal position to the consumables replenishment position.

Figure 18:
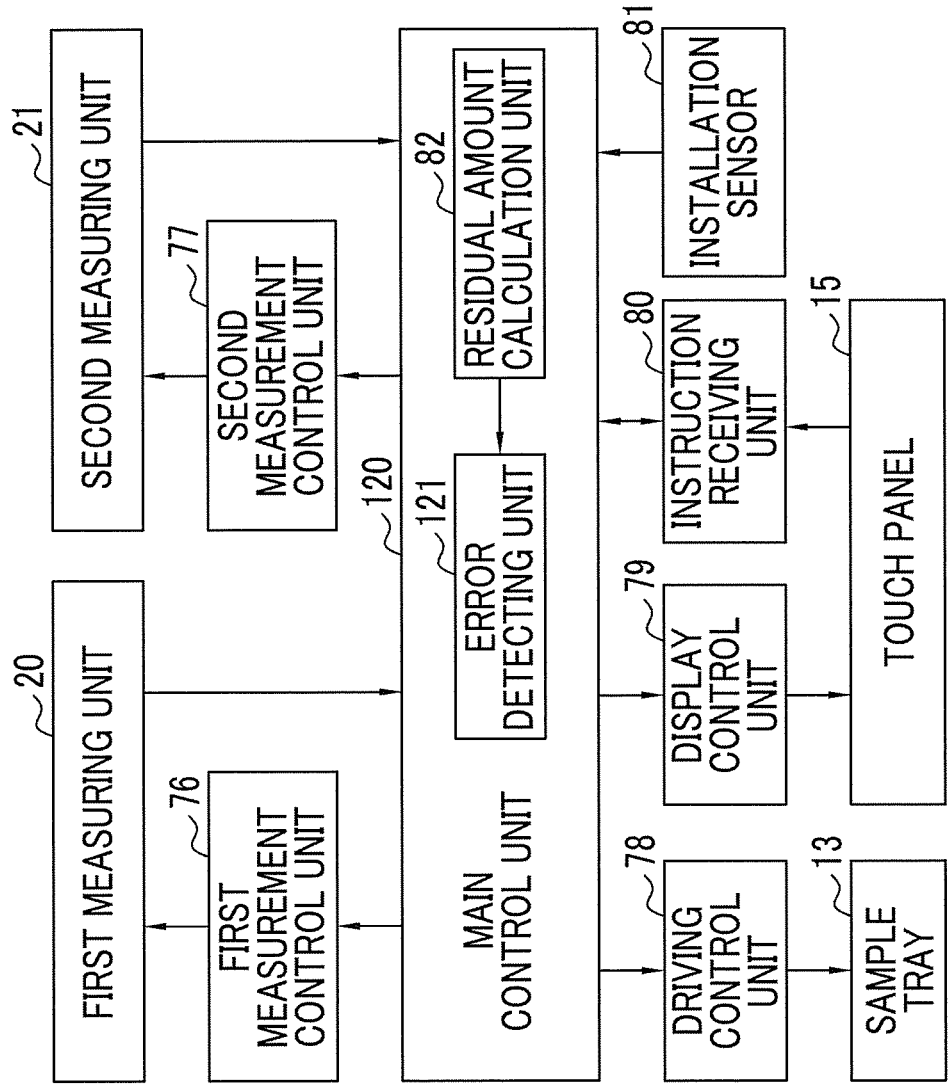
FIG. 18 is a block diagram of a biochemical analysis apparatus of a second embodiment.
Figure 19:
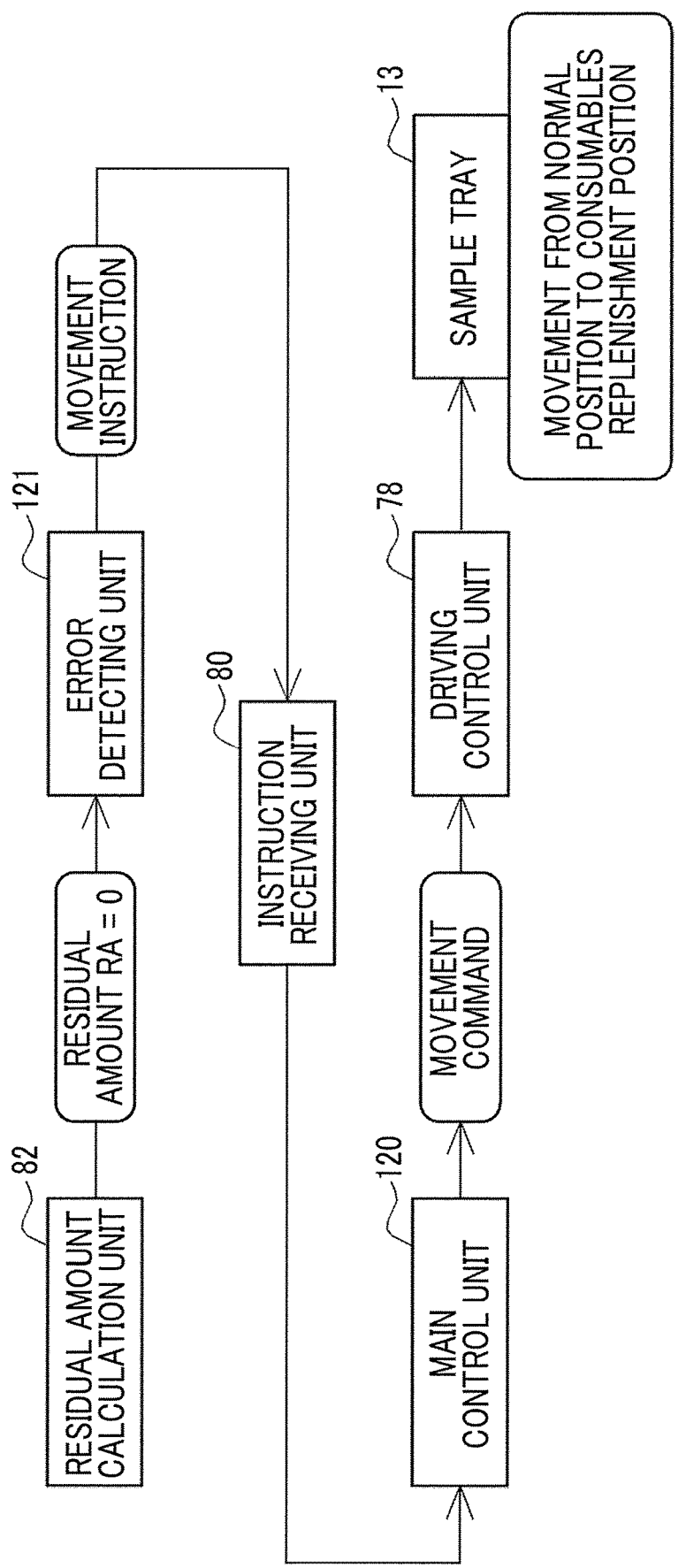
FIG. 19 is a view illustrating a flow of the processing until a sample tray moves to a consumables replenishment position from error detection.

In FIG. 18, in the second embodiment, the main control unit 120 is provided with an error detecting unit 121 in addition to the residual amount calculation unit 82. As illustrated in FIG. 19, in a case where the residual amount RA of consumables reaches zero, the residual amount calculation unit 82 outputs the fact to the error detecting unit 121. The error detecting unit 121 detects that the residual amount RA of the consumables reaches zero, as an error regarding the consumables. In a case where an error is detected, the error detecting unit 121 outputs the movement instruction to the instruction receiving unit 80. The flow of the subsequent processing is the same as that in the case of the above first embodiment illustrated in FIG. 11.

Figure 20:
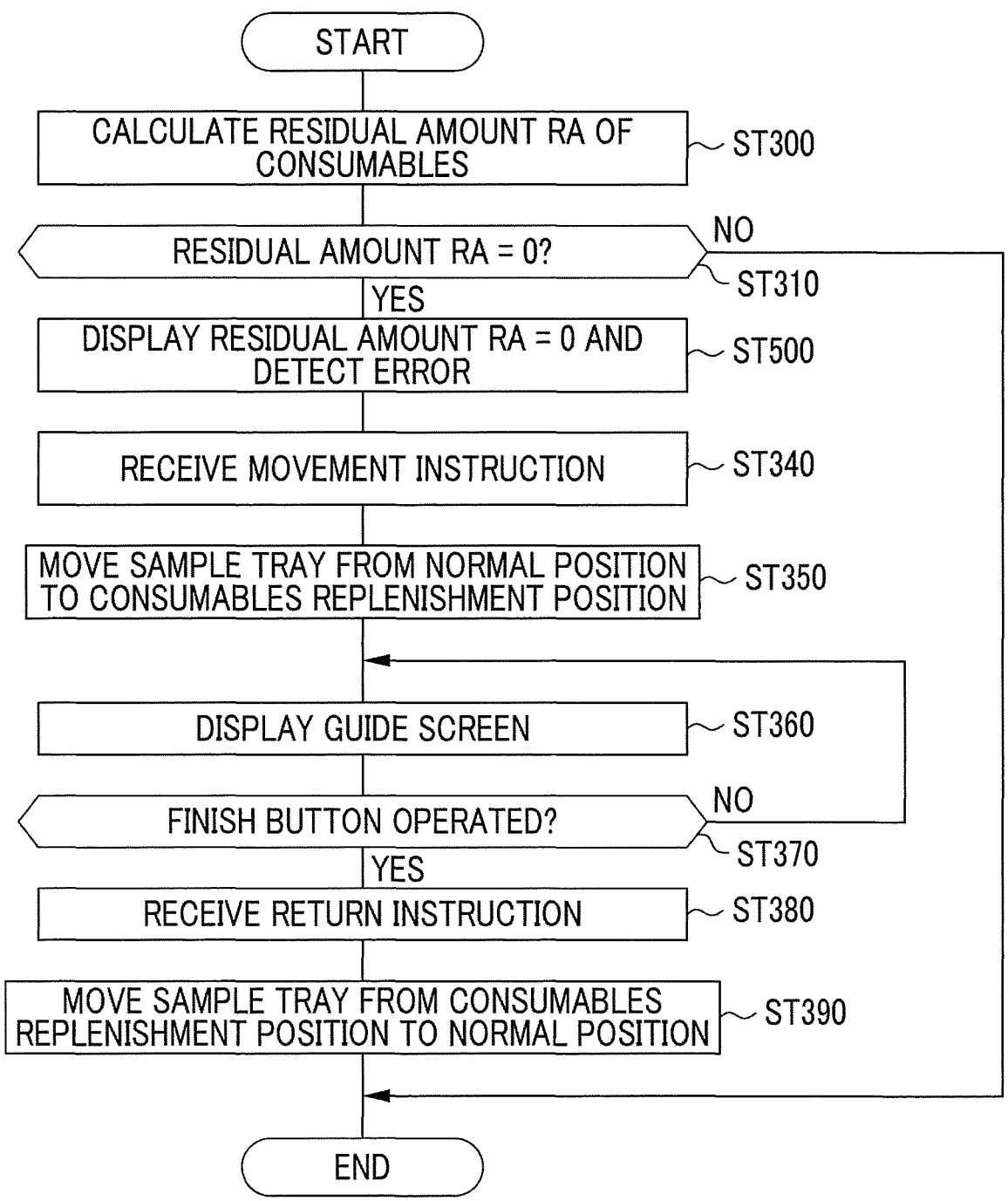
FIG. 20 is a flowchart illustrating a processing procedure for the biochemical analysis apparatus of the second embodiment.

As illustrated in FIG. 20, in the second embodiment, in a case where the residual amounts RA reach zero (YES in Step ST310), the fact that the residual amounts RA are zero is displayed on the second display sections 101 to 104 by the display control unit 79, and an error is detected by the error detecting unit 121 (Step ST500). Then, the movement instruction for the sample tray 13 is output from the error detecting unit 121, and the movement instruction is received by the instruction receiving unit 80 without the operation of the second display sections 101 to 104 (Step ST340, an instruction receiving step).

Also in the second embodiment, similarly to the first embodiment, the guide screen 110 is displayed on the touch panel 15 by the display control unit 79 (Step ST360). In this case, the replenishment guides 111 are equivalent to guides showing a method for handling the error. That is, the display control unit 79 is equivalent to the second display control unit.

In this way, in a case where an error is detected by the error detecting unit 121, the movement instruction for the sample tray 13 is output to the instruction receiving unit 80. Thus, the sample tray 13 can be automatically moved from the normal position to the consumables replenishment position without waiting for the operation of the second display sections 101 to 104. Additionally, in a case where an error is detected by the error detecting unit 121, the guides (replenishment guides 111) showing the method for handling the error are displayed. Thus, the user can exactly handle the error even without referring to an instruction manual or the like, and user convenience can be enhanced.

In addition, the error to be detected by the error detecting unit 121 may be deviation between installation positions of the consumables, installation of nonstandard consumables, leakage of the diluting solutions and the reference solution, or the like instead of or in addition to the residual amounts RA of consumables having reached zero.

Third Embodiment

In the above first embodiment, in the main screen 90, the display posture of the layout diagram 91 is always the same such that the first region 55 on the opening part 16 side (front side) is a lower side, and the second region 56 on the side (back side) opposite to the opening part 16 is an upper side. However, in the third embodiment illustrated in FIG. 21, the display control unit 79 changes the display posture of the layout diagram 91 in accordance with the rotational position of the rotary disk 35 of the sample tray 13.

FIG. 21 illustrates a case where the rotary disk 35 is rotationally driven to a position where the sample installation part 37D faces the spotting unit 19. In this case, the display posture of the layout diagram 91 of the main screen 90 is also changed by the display control unit 79 such that the first display section 100D corresponding to the sample installation part 37D is at a 9 o'clock position in accordance with the rotational position of the rotary disk 35.

In this way, in a case where the display posture of the layout diagram 91 is changed in accordance with the rotational position of the rotary disk 35 of the sample tray 13, it can be seen in one glance that any of the sample installation parts 37 is at any position and what kind of processing is applied.

In addition, in a case where the rotary disk 35 has been moved to the consumables replenishment position, the guide screen 110 is displayed after the layout diagram 91 is changed to a display posture imitating the consumables replenishment position in the main screen 90. This allows the movement of the rotary disk 35 to the consumables replenishment position to visually appeal to the user.

Although the circular sample tray 13 has been illustrated in the above respective embodiments, the shape of the sample tray may not be circular, and may be, for example, rectangular.

In addition, the sample IDs may be patient IDs or hospitalized animals IDs including symbols and numbers attached to patients or hospitalized animals in a hospital where the biochemical analysis apparatus 10 is installed.

In the above-described respective embodiments, hardware structures of processing units, which execute various kinds of processing, such as the driving control unit 78, the display control unit 79 that is the first and second display control units, the instruction receiving unit 80, and the residual amount calculation unit 82, and the error detecting unit 121 are various processors as illustrated below. The various processors include a central processing unit (CPU) that is a general-purpose processor, a programmable logic device (PLD) that is a processor capable of changing a circuit configuration after manufacture of a field programmable gate array (FPGA) or the like, and exclusive electric circuits, which are processors having circuit configurations exclusively designed to execute specific processing, such as an application specific integrated circuit (ASIC).

One processing unit may be constituted of one of these various processors, or may be constituted of a combination of two or more same or different types of processors (for example, a combination of a plurality of the FPGAs or a combination of the CPU and the FPGA). Additionally, the plurality of processing units may be constituted of one processor. As an example in which the plurality of processing units are constituted of the one processor, firstly, there is a form in which one processor is constituted of a combination of one or more CPUs and software and this processor functions as the plurality of processing units. Secondly, as represented by a system-on-chip (SOC) or the like, there is a form in which a processor, which realizes functions of an overall system including the plurality of processing units with one integrated circuit (IC) chip, is used. In this way, the various processing units are configured by using one or more of the above various processors as the hardware structure(s).

Moreover, the hardware structures of these various processors are more specifically circuitries in which circuit elements, such as semiconductor elements, are combined together.

From the above description, it is possible to ascertain the invention shown in the following appendix.

[Appendix 1]

A biochemical analysis apparatus comprising:

a sample tray that are provided with a sample installation part in which a sample container accommodating a sample to be subjected to biochemical analysis is installed, and a consumables installation part in which consumables to be used for the biochemical analysis are installed;

an apparatus body that accommodates the sample tray;

an opening part that is provided in the apparatus body and leads to the sample tray;

an instruction receiving processor that receives a movement instruction for moving the sample tray from a normal position where the sample installation part is disposed on the opening part side to a consumables replenishment position where the consumables installation part is disposed on the opening part side; and a driving control processor that controls driving of the sample tray and moves the sample tray from the normal position to the consumables replenishment position in a case where the movement instruction is received by the instruction receiving processor.

In the invention, it is also possible to appropriately combine the above-described various embodiments and various modification examples together. Additionally, it is needless to say that the invention is not limited to the above respective embodiments and various configurations can be adopted unless departing from the scope of the invention.

EXPLANATION OF REFERENCES

10: biochemical analysis apparatus
10A: apparatus body
11: sample container
12: cartridge
13: sample tray
14: lid
14A: opening part
14B: cover part
15: touch panel
16: opening part
17: discard box
18: spotting mechanism
19: spotting unit
20, 21: first and second measuring units
22: dispenser
25: dry analysis element
25A: spotting hole
26: nozzle tip
30: table
35: rotary disk
36: non-rotating part
37, 37A to 37E: sample installation part
38: sample container installation hole
39: cartridge installation hole
45: nozzle tip installation part
46: diluting solution installation part
47: mixing cup installation part
48: tip rack
49: diluting solution container
50: mixing cup
55: first region
56: second region
57: reference solution container
58: reference solution installation part
60: spotting opening
61: element holder
65: rotating member
66: inclined rotating cylinder
66A: inner hole
67: bearing
68A: element storage chamber
68: photometric window
69: photometric head
75, 120: main control unit
76, 77: first and second measurement control units
78: driving control unit
79: display control unit (first and second display control units)
80: instruction receiving unit
81: installation sensor
82: residual amount calculation unit
90: main screen
91: layout diagram
92: message display region
93: result display switching region
94: message
95: call button display region
96: summary display button
97A, 97B: button display region
98: call button
100, 100A to 100E: first display section
101 to 104: second display section (first driving button)
110: guide screen
111: replenishment guide (guide showing method for handling error)
112: position display diagram
113: reset button
114: tab
115: finish button (second driving button)
121: error detecting unit
INID: installation part-identification information
R: supply path
C1R: center of first region
C2R: center of second region
CA: center of opening part
RA: residual amount
SID: sample ID
ST100 to ST210, ST300 to ST390, ST500: step

What is claimed is:

1. A biochemical analysis apparatus comprising:
a sample tray, provided with a sample installation part in which a sample container accommodating a sample to be subjected to biochemical analysis is installed, and a consumables installation part in which consumables to be used for the biochemical analysis are installed;
an apparatus body, accommodating the sample tray;
an opening part, provided in the apparatus body and leading to the sample tray;
an instruction receiving unit, receiving a movement instruction for moving the sample tray from a normal position where the sample installation part is disposed on the opening part side to a consumables replenishment position where the consumables installation part is disposed on the opening part side;
a driving control unit, controlling driving of the sample tray and moving the sample tray from the normal position to the consumables replenishment position in a case where the movement instruction is received by the instruction receiving unit;
a first display control unit, schematically displaying an array state of the sample installation part and the consumables installation part in the sample tray, and performing a control such that a layout diagram provided with a first display section corresponding to the sample installation part and a second display section corresponding to the consumables installation part is displayed on a display unit,
wherein the first display control unit displays a residual amount of the consumables on the second display section,
wherein in a case the residual amount of the consumables reaches zero, the second display section functions as a first driving button, and the first driving button outputs the movement instruction to the instruction receiving unit in accordance with an operation;

wherein the sample tray is circular, and is rotationally driven around an axis thereof under the control of the driving control unit, when the movement instruction for the sample tray is received by the instruction receiving unit, the sample tray is moved from the normal position to the consumables replenishment position, and the first display control unit displays a guide screen, wherein the guide screen shows a position diagram indicating a display posture of the layout diagram in accordance with a rotational position of the sample tray, and displays replenishment guides of the consumables.

2. The biochemical analysis apparatus according to claim 1, further comprising:

an error detecting unit, detecting an error regarding the consumables and outputs the movement instruction to the instruction receiving unit in a case where the error is detected.

3. The biochemical analysis apparatus according to claim 2, further comprising:

a second display control unit that performs a control such that guides showing a method for handling the error are displayed on a display unit in a case where the error is detected by the error detecting unit.

4. The biochemical analysis apparatus according to claim 2, wherein the error detecting unit detects that the residual amount of the consumables reaches zero, as the error.

5. The biochemical analysis apparatus according to claim 1, further comprising:

a second driving button that outputs a return instruction for returning the sample tray from the consumables replenishment position to the normal position to the instruction receiving unit in accordance with an operation, wherein the driving control unit moves the sample tray from the consumables replenishment position to the normal position in a case where the second driving button is operated and the return instruction is received by the instruction receiving unit.

6. The biochemical analysis apparatus according to claim 1, wherein the sample installation part and the consumables installation part are disposed in an arcuate shape.

7. The biochemical analysis apparatus according to claim 1, wherein a plurality of the sample installation parts and a plurality of the consumables installation parts are provided, wherein the plurality of sample installation parts are collectively disposed in a first region of the sample tray, and wherein the plurality of consumables installation parts are collectively disposed in a second region that is a remaining region excluding the first region.

8. The biochemical analysis apparatus according to claim 7, wherein the consumables replenishment position is a position where a center of the second region coincides with a center of the opening part.

9. A method of operating a biochemical analysis apparatus comprising a sample tray that is provided with a sample installation part in which a sample container accommodating a sample to be subjected to biochemical analysis is installed, and a consumables installation part in which consumables to be used for the biochemical analysis are installed, an apparatus body that accommodates the sample tray, and an opening part that is provided in the apparatus body and leads to the sample tray, the method comprising:

a first display controlling step of schematically displaying an array state of the sample installation part and the consumables installation part in the sample tray by a first display control unit, and performing a control such that a layout diagram provided with a first display section corresponding to the sample installation part and a second display section corresponding to the consumables installation part is displayed on a display unit, wherein the first display control unit displays a residual amount of the consumables on the second display section;

an instruction receiving step of receiving a movement instruction for moving the sample tray from a no' mal position where the sample installation part is disposed on the opening part side to a consumables replenishment position where the consumables installation part is disposed on the opening part side by an instruction receiving unit;

a functioning step of functioning at least a partial region of the second display section where the residual amount of the consumables reaches zero as a first driving button that outputs the movement instruction to the instruction receiving unit in accordance with an operation; and a driving control step of controlling driving of the sample tray and moving the sample tray from the normal position to the consumables replenishment position in a case where the movement instruction is received in the instruction receiving step, wherein the sample tray is circular, and is rotationally driven around an axis thereof in the driving control step, and wherein in the first display controlling step, when the movement instruction for the sample tray is received by the instruction receiving unit, the sample tray is moved from the normal position to the consumables replenishment position, and the first display control unit displays a guide screen, the guide screen shows a display posture of the layout diagram that is changed in accordance with a rotational position of the sample tray, and replenishment guides of the consumables are displayed.

* * * * *